United States Patent
Tsunoda et al.

(10) Patent No.: US 8,034,504 B2
(45) Date of Patent: Oct. 11, 2011

(54) FUEL CELL SYSTEM AND METHOD OF OPERATING SAME

(75) Inventors: Tadashi Tsunoda, Nerima-ku (JP); Hiroki Homma, Asaka (JP); Tetsuya Ogawa, Wako (JP); Koji Dan, Niiza (JP)

(73) Assignee: Honda Motor Co., Ltd., Tokyo (JP)

( * ) Notice: Subject to any disclaimer, the term of this patent is extended or adjusted under 35 U.S.C. 154(b) by 136 days.

(21) Appl. No.: 12/301,397

(22) PCT Filed: May 16, 2007

(86) PCT No.: PCT/JP2007/060470
§ 371 (c)(1),
(2), (4) Date: Nov. 18, 2008

(87) PCT Pub. No.: WO2007/136077
PCT Pub. Date: Nov. 29, 2007

(65) Prior Publication Data
US 2009/0280364 A1    Nov. 12, 2009

(30) Foreign Application Priority Data

May 18, 2006  (JP) ................................. 2006-138617

(51) Int. Cl.
*H01M 8/06* (2006.01)
*H01M 2/38* (2006.01)
*H01M 2/40* (2006.01)
*H01M 8/24* (2006.01)

(52) U.S. Cl. ......... 429/454; 429/408; 429/415; 429/420

(58) Field of Classification Search .................. 429/19, 429/26, 30, 32, 33, 34, 35, 37, 38, 39
See application file for complete search history.

(56) References Cited

U.S. PATENT DOCUMENTS

| | | | |
|---|---|---|---|
| 6,186,254 B1* | 2/2001 | Mufford et al. | 429/13 |
| 6,374,166 B1* | 4/2002 | Takeda | 701/22 |
| 2003/0157386 A1 | 8/2003 | Gottmann et al. | |
| 2003/0224231 A1 | 12/2003 | Penev | |
| 2004/0081871 A1 | 4/2004 | Kearl et al. | |
| 2004/0121214 A1* | 6/2004 | Akasaka et al. | 429/34 |

(Continued)

FOREIGN PATENT DOCUMENTS

EP    1513208 A2    3/2005

(Continued)

*Primary Examiner* — Jennifer K. Michener
*Assistant Examiner* — Eli Mekhlin
(74) *Attorney, Agent, or Firm* — Nelson Mullins Riley & Scarborough LLP; Anthony A. Laurentano

(57) ABSTRACT

A fuel cell system includes a fuel cell, a fuel gas supply unit for supplying a fuel gas to the fuel cell, an oxygen containing gas supply unit, which has a heat exchanger for heating an oxygen-containing gas, for supplying the oxygen-containing gas heated by the heat exchanger to the fuel cell, an exhaust gas discharge unit for supplying an exhaust gas used in a generating reaction and discharged from the fuel cell, as a heating medium for heating the oxygen-containing gas to the heat exchanger, and a combustion gas supply unit, which has a combustor disposed out of a passageway of the exhaust gas discharge unit for generating a combustion gas by combusting a raw fuel with an oxygen-containing gas supplied thereto, for supplying the combustion gas, together with the exhaust gas, to the heat exchanger.

13 Claims, 28 Drawing Sheets

U.S. PATENT DOCUMENTS

2005/0164051 A1 7/2005 Venkataraman et al.

FOREIGN PATENT DOCUMENTS

| | | |
|---|---|---|
| EP | 1557897 A1 | 7/2005 |
| EP | 1659654 A1 | 5/2006 |
| JP | 60-195880 | 10/1985 |
| JP | 63-119163 | 5/1988 |
| JP | 64-71075 | 3/1989 |
| JP | 1-176668 | 7/1989 |
| JP | 6-76849 | 3/1994 |
| JP | 2004-152757 | 5/2004 |
| JP | 2005-166439 | 6/2005 |

* cited by examiner

US 8,034,504 B2

FUEL CELL SYSTEM AND METHOD OF OPERATING SAME

RELATED APPLICATIONS

This application is a 35 U.S.C. 371 national stage filing of International Application No. PCT/JP2007/060470, filed 16 May 2007, which claims priority to Japan Patent Application No. 2006-138617 filed on 18 May 2006 in Japan. The contents of the aforementioned applications are hereby incorporated by reference.

TECHNICAL FIELD

The present invention relates to a fuel cell system having an electrolyte electrode assembly which comprises an electrolyte interposed between an anode and a cathode, and a method of operating such a fuel cell system.

BACKGROUND ART

Solid oxide fuel cells (SOFC) have an electrolyte comprising an oxide ion conductor such as stabilized zirconia, for example. In the solid oxide fuel cells, a membrane electrode assembly (MEA) including an anode and a cathode that are disposed on each side of the electrolyte is sandwiched by separators (bipolar plates). Usually, the solid oxide fuel cell is used in the form of a fuel cell stack comprising a predetermined number of stacked MEAs and separators.

The fuel cell stack is operated at a high temperature of 800° C. or higher. When the fuel cell stack starts to operate, therefore, it is desirable to quickly heat the fuel cell stack to the desired temperature with a combustor. The combustor is usually positioned at an oxygen-containing gas discharge outlet of the fuel cell stack. For example, there is known a solid electrolyte fuel cell electric generator disclosed in Japanese Laid-Open Patent Publication No. 6-76849.

In the disclosed solid electrolyte fuel cell electric generator, as shown in FIG. 28 of the accompanying drawings, air and fuel are heated from a normal temperature to a predetermined temperature by respective heat exchangers 1, 2, and thereafter supplied to a fuel cell 3. In the fuel cell 3, the supplied air and fuel initiate a generating reaction. An exhaust gas discharged from the fuel cell 3 after being used in the generating reaction is introduced into an afterburner 4 which serves as a combustor.

The afterburner 4 burns the fuel remaining in the exhaust gas and produces a combustion gas, which is supplied as a heating medium for heating the air and the fuel to the heat exchangers 1, 2. At this time, air at room temperature is added from an air supply system 5 to the combustion gas to be supplied to the heat exchangers 1, 2, thereby lowering the temperature of the combustion gas.

According to the conventional solid electrolyte fuel cell electric generator, however, since the fuel remaining in the high-temperature exhaust gas from the fuel cell 3 is burned by the afterburner 4 to produce the higher-temperature combustion gas, conditions to be met for designing the afterburner 4, e.g., conditions for selecting heat-resistant materials of the afterburner 4, are highly strict. Especially, since the afterburner 4 is exposed to the exhaust gas at high temperature throughout the operation, the durability of the afterburner 4 is lowered.

Furthermore, when the fuel cell 3 starts to operate, the temperature of the gas discharged from the fuel cell 3 varies. In order to keep the temperature of the exhaust gas in a given temperature range, the afterburner 4 needs to be controlled according to a complex control process. Therefore, the stability of the fuel cell 3 at the time it starts to operate is liable to be lowered.

DISCLOSURE OF INVENTION

It is an object of the present invention to provided a fuel cell system which is capable of effectively increasing the durability of a combustor with a simple arrangement and process and which is capable of controlling the combustor simply and highly accurately, and a method of operating such a fuel cell system.

A fuel cell system according to the present invention includes a fuel cell having an electrolyte electrode assembly which comprises an anode, a cathode and an electrolyte interposed between the anode and the cathode, a fuel gas supply unit for supplying a fuel gas to the fuel cell, an oxygen containing gas supply unit, which has a heat exchanger for heating an oxygen-containing gas, for supplying the oxygen-containing gas heated by the heat exchanger to the fuel cell, an exhaust gas discharge unit for supplying an exhaust gas discharged from the fuel cell after being used in a generating reaction, as a heating medium for heating the oxygen-containing gas to the heat exchanger, and a combustion gas supply unit, which has a combustor disposed out of a passageway of the exhaust gas discharge unit for generating a combustion gas by combusting a fuel with an oxygen-containing gas supplied thereto, for supplying the combustion gas, together with the exhaust gas, to the heat exchanger.

A fluid passage which is supplied with a fluid before the fluid is heated refers to a fluid passage for supplying the fuel or the oxygen-containing gas to the combustor of the fuel gas supply unit, a fluid passage for supplying the raw fuel or the fuel gas to an evaporator or a reformer of the fuel gas supply unit or the fuel cell, or a fluid passage for supplying the oxygen-containing gas to the heat exchanger of the oxygen containing gas supply unit, for example. A fluid passage which is supplied with a fluid after the fluid is cooled refers to a fluid passage for discharging a heating medium (the exhaust gas or the combustion gas) which has been used to heat the heat exchanger, the reformer, or the evaporator and whose temperature has dropped, for example.

According to the present invention, there is also provided a method of operating a fuel cell system including a fuel cell, the fuel cell having an anode and a cathode by supplying a fuel gas to the anode, heating an oxygen-containing gas with a heat exchanger, and supplying the heated oxygen-containing gas to the cathode.

The method comprises the steps of supplying a fuel (e.g., a raw fuel) and the oxygen-containing gas to a combustor to generate a combustion gas, and supplying the combustion gas as a heating medium to the heat exchanger, mixing an exhaust gas discharged from the fuel cell after being used in a generating reaction, with the combustion gas, and supplying the exhaust gas mixed with the combustion gas to the heat exchanger, detecting a temperature of at least one of the fuel cell, the fuel gas supply unit, the oxygen containing gas supply unit, the combustion gas supply unit, and the exhaust gas discharge unit, and regulating a flow rate of at least one of the fuel gas, the oxygen-containing gas, the fuel, the combustion gas, and the exhaust gas, based on the detected temperature.

According to the present invention, the combustor is disposed out of the passageway of the exhaust gas discharge unit, and is supplied with the fuel and the oxygen-containing gas that are kept in a constant temperature range for generating the combustion gas. Therefore, the combustor can easily generate the combustion gas at a desired temperature, and can be controlled simply and highly accurately. Furthermore, the combustor is not exposed to the high-temperature exhaust gas from the fuel cell, and hence remains highly durable.

The combustion gas discharged from the combustor is added to the exhaust gas from the fuel cell, and is thereafter supplied to the heat exchanger. Therefore, it is possible to accurately adjust the temperature of the combustion gas supplied to the heat exchanger. This allows the heat exchanger to be designed under less strict conditions than heretofore. The fuel supplied to the combustor can reliably be combusted stably because the temperatures and flow rates of the fuel and the oxygen-containing gas supplied to the combustor can be set to substantially constant conditions.

BEST MODE FOR CARRYING OUT THE INVENTION

Figure 1:
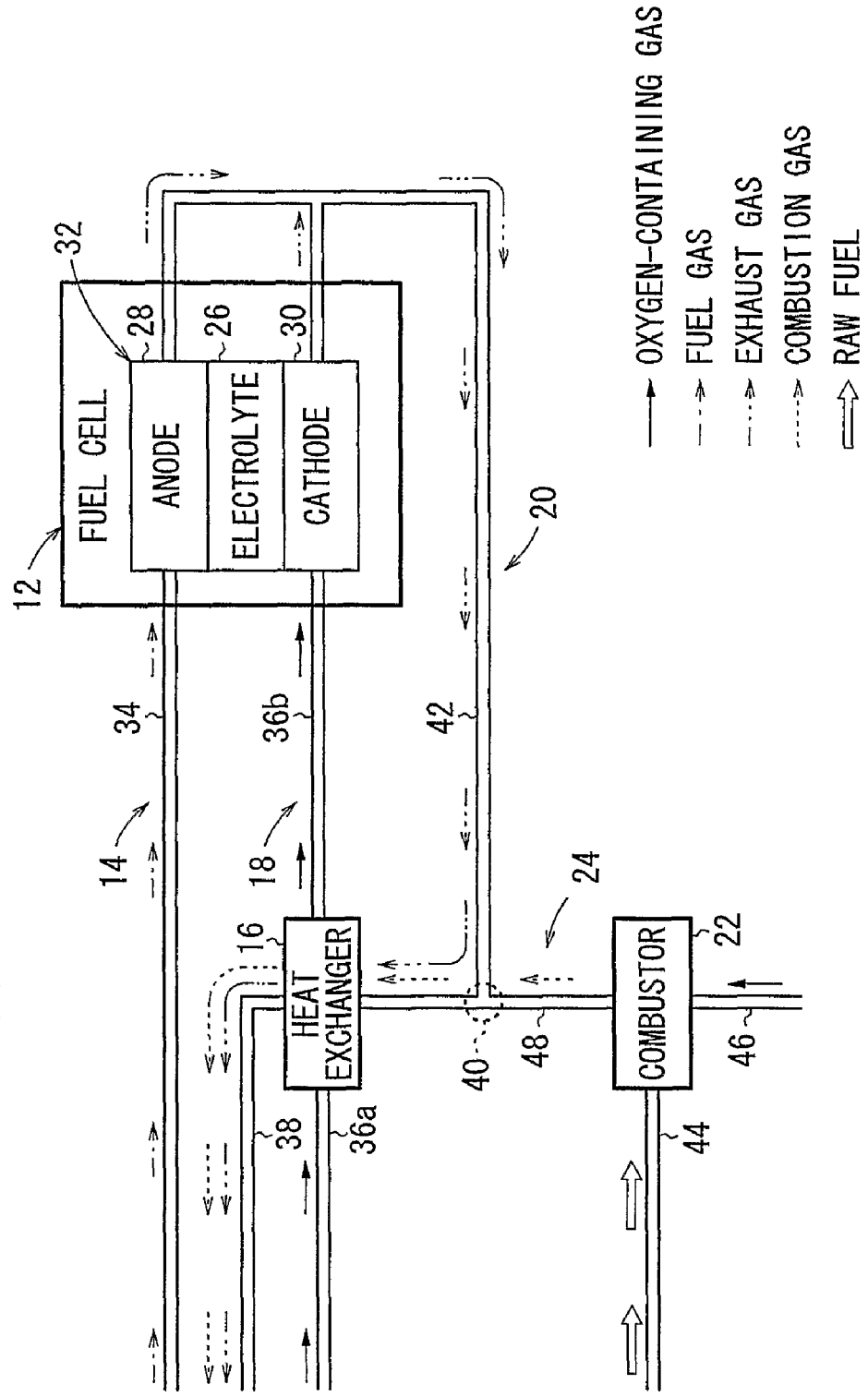
FIG. 1 is a block diagram of a fuel cell system according to a first embodiment of the present invention.

FIG. 1 shows in block form a fuel cell system 10 according to a first embodiment of the present invention.

As shown in FIG. 1, the fuel cell system 10 comprises a fuel cell 12, a fuel gas supply unit 14 for supplying the fuel cell 12 with a fuel gas, an oxygen containing gas supply unit 18, which has a heat exchanger 16 for heating an oxygen-containing gas, for supplying the oxygen-containing gas heated by the heat exchanger 16 to the fuel cell 12, an exhaust gas discharge unit 20 for supplying an exhaust gas discharged from the fuel cell 12 after being used in a generating reaction, as a heating medium for heating the oxygen-containing gas to the heat exchanger 16, and a combustion gas supply unit 24, which has a combustor 22 disposed out of the passageway of the exhaust gas discharge unit 20 for generating a combustion gas by combusting a raw fuel with an oxygen-containing gas supplied thereto, for supplying the combustion gas, together with the exhaust gas from the fuel cell 12, to the heat exchanger 16.

The fuel cell 12 has an electrolyte electrode assembly (membrane electrode assembly) 32 which includes an electrolyte 26 comprising an oxide ion conductor such as stabilized zirconia, for example, an anode 28 disposed on one side of the electrolyte 26, and a cathode 30 disposed on the other side of the electrolyte 26. Actually, the fuel cell 12 is in the form of a fuel cell stack comprising a number of stacked electrolyte electrode assemblies 32 and separators, not shown.

The fuel gas supply unit 14 has a fuel gas supply passage 34 for supplying the fuel gas to the anode 28 of the electrolyte electrode assembly 32.

The oxygen containing gas supply unit 18 has a first oxygen-containing gas supply passage 36a for supplying the oxygen-containing gas to the heat exchanger 16, a second oxygen-containing gas supply passage 36b for supplying the oxygen-containing gas heated by the heat exchanger 16 to the cathode 30 of the electrolyte electrode assembly 32, and a discharge passage 38 for discharging the combustion gas supplied as the heating medium to the heat exchanger 16 after the combustion gas has heated the oxygen-containing gas through a heat exchange.

The exhaust gas discharge unit 20 has an exhaust gas supply passage 42 for supplying the exhaust gas (including the fuel gas and the oxygen-containing gas which have not been consumed) discharged from the anode 28 and the cathode 30 of the electrolyte electrode assembly 32, to a junction 40 where the exhaust gas discharge unit 20 and the combustion gas supply unit 24 are connected to each other. The exhaust gas discharge unit 20 also has the discharge passage 38 which serves to discharge the exhaust gas supplied as the heating medium to the heat exchanger 16 after the exhaust gas has heated the oxygen-containing gas through a heat exchange. Therefore, the discharge passage 38 is a component of each of the combustion gas supply unit 24 and the exhaust gas discharge unit 20.

The combustion gas supply unit 24 has a raw fuel supply passage 44 for supplying the combustor 22 with a raw fuel, e.g., a hydrogen-containing gas such as a methane gas, an ethane gas, a propane gas, or the like, an oxygen-containing gas supply passage 46 for supplying the combustor 22 with an oxygen-containing gas, and a combustion gas supply passage 48 for supplying the combustion gas discharged from the combustor 22 to the heat exchanger 16. The combustion gas supply passage 48 has the junction 40 connected to the exhaust gas supply passage 42. The fuel to be supplied to the combustor 22 may be the raw fuel referred to above or any of various hydrogen-containing gases.

Operation of the fuel cell system 10 will be described below.

When the fuel cell system 10 starts to operate, the exhaust gas discharged from the fuel cell 12 after being used in the generating reaction in the fuel cell 12 to the exhaust gas discharge unit 20 is kept at a relatively low temperature. Therefore, the combustion gas generated by the combustor 22 is supplied to the heat exchanger 16 to heat the oxygen-containing gas supplied to the heat exchanger 16 to a desired temperature.

Specifically, the combustor 22 is supplied with the raw fuel through the raw fuel supply passage 44 and is also supplied with the oxygen-containing gas through the oxygen-containing gas supply passage 46. The combustor 22 combusts the raw fuel with the oxygen-containing gas, and supplies a combustion gas at a relatively high temperature to the heat exchanger 16 through the combustion gas supply passage 48.

The heat exchanger 16 is also supplied with the oxygen-containing gas through the first oxygen-containing gas supply passage 36a. In the heat exchanger 16, a heat exchange occurs between the oxygen-containing gas and the combustion gas. The oxygen-containing gas is heated by the combustion gas to a desired fuel cell operating temperature, and supplied to the cathode 30 in the fuel cell 12 through the second oxygen-containing gas supply passage 36b.

The anode 28 in the fuel cell 12 is supplied with the fuel gas through the fuel gas supply passage 34 of the fuel gas supply unit 14. In the electrolyte electrode assembly 32, oxide ions move through the electrolyte 26 into the anode 28, generating electric energy by way of a chemical reaction.

The gas including the fuel gas and the oxygen-containing gas that have been used in the generating reaction is discharged from the fuel cell 12 as an exhaust gas to the exhaust gas discharge unit 20. The exhaust gas flows through the exhaust gas supply passage 42 to the junction 40 where the exhaust gas is added to the combustion gas. The exhaust gas and the combustion gas are then supplied to the heat exchanger 16 to heat new oxygen-containing gas supplied from the first oxygen-containing gas supply passage 36a. After having heated the oxygen-containing gas, the exhaust gas and the combustion gas are discharged from the heat exchanger 16 through the discharge passage 38.

According to the first embodiment, the combustor 22 is disposed out of the passageway of the exhaust gas discharge unit 20, and generates the combustion gas by burning the raw fuel supplied through the raw fuel supply passage 44 with the oxygen-containing gas supplied through the oxygen-containing gas supply passage 46. Specifically, the combustor 22 is supplied with air (the oxygen-containing gas) and a city gas or the like (the raw fuel) that are maintained under a substantially constant condition, e.g., at room temperature.

Consequently, the combustor 22 can be controlled simply and highly accurately. As the temperature, flow rate, etc. of the raw fuel and the oxygen-containing gas that are supplied to the combustor 22 can be set to substantially constant conditions, the combustor 22 can combust the raw fuel stably and reliably. In addition, the combustor 22 is highly durable because it is not exposed to the high-temperature gas discharged from the fuel cell 12.

The combustion gas discharged from the combustor 22 is added to the exhaust gas supplied from the exhaust gas supply passage 42, and is thereafter supplied to the heat exchanger 16. Therefore, it is possible to accurately adjust the temperature of the combustion gas supplied to the heat exchanger 16. This allows the heat exchanger 16 to be designed under less strict conditions than heretofore because the heat exchanger 16 will not be exposed to the combustion gas at an unduly high temperature.

Furthermore, the fuel cell 12 is prevented from being directly exposed to the combustion gas from the combustor 22.

Figure 2:
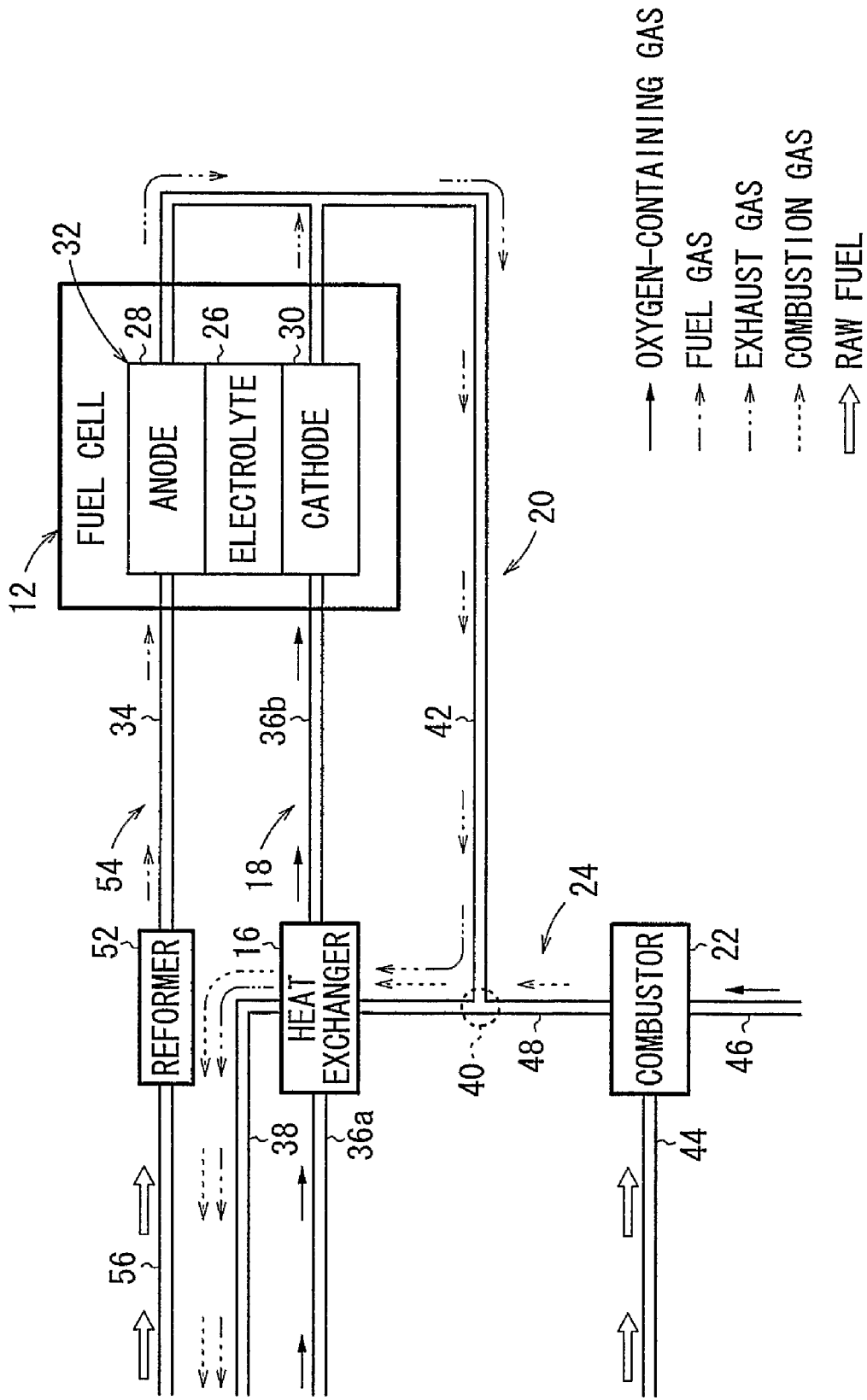
FIG. 2 is a block diagram of a fuel cell system according to a second embodiment of the present invention.

FIG. 2 shows in block form a fuel cell system 50 according to a second embodiment of the present invention. Those parts of the fuel cell system 50 according to the second embodiment which are identical to those of the fuel cell system 10 according to the first embodiment are denoted by identical reference characters, and will not be described in detail below. Similarly, those parts of fuel cell systems according to third through twenty-sixth embodiments, to be described below, of the present invention which are identical to those of the fuel cell system 10 according to the first embodiment are denoted by identical reference characters, and will not be described in detail below.

As shown in FIG. 2, the fuel cell system 50 has a fuel gas supply unit 54 comprising a reformer 52 for reforming a raw fuel, which chiefly contains hydrocarbon, into a fuel gas. The fuel gas supply unit 54 has a raw fuel supply passage 56 for supplying the raw fuel to the reformer 52. The raw fuel supplied to the reformer 52 may be the same as the raw fuel that is supplied to the raw fuel supply passage 44 connected to the combustor 22. According to the second embodiment, therefore, various raw fuels may be used to generate the fuel gas to be supplied to the fuel cell 12.

Figure 3:
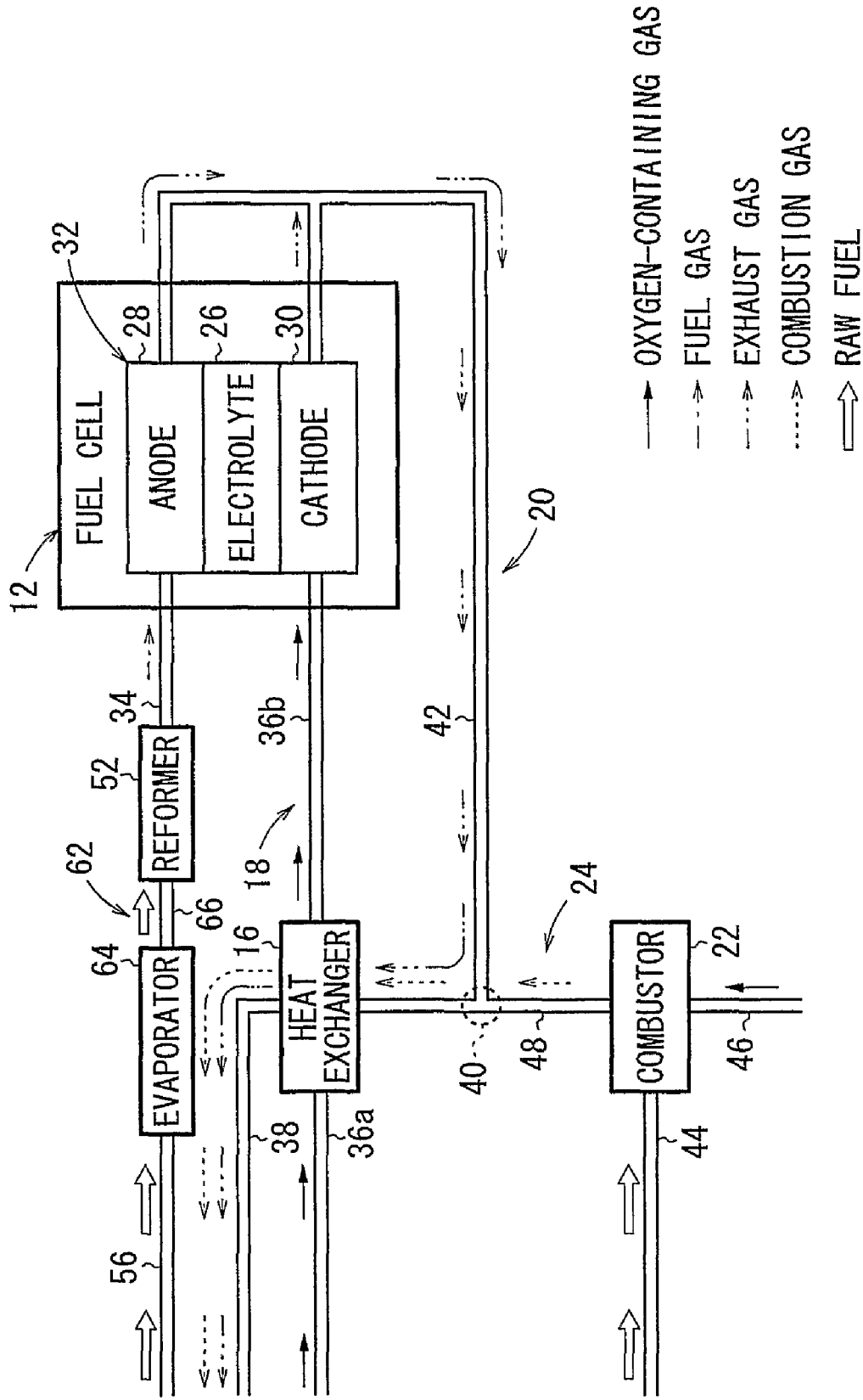
FIG. 3 is a block diagram of a fuel cell system according to a third embodiment of the present invention.

FIG. 3 shows in block form a fuel cell system 60 according to a third embodiment of the present invention.

As shown in FIG. 3, the fuel cell system 60 has a fuel gas supply unit 62 comprising an evaporator 64 for evaporating water to generate a mixed fuel including a raw fuel and water vapor, and the reformer 52 for reforming the mixed fuel into a fuel gas. The raw fuel supply passage 56 is connected to the evaporator 64, which is connected to the reformer 52 by a mixed fuel supply passage 66.

According to the third embodiment, the fuel cell 12 uses a fuel gas that is produced by reforming the raw fuel with the water vapor. The raw fuel may be the same as the raw fuel that is supplied to the combustor 22. According to the third embodiment, therefore, various raw fuels may be used, making the fuel cell system 60 versatile in use. The third embodiment thus offers the same advantages as the second embodiment.

Figure 4:
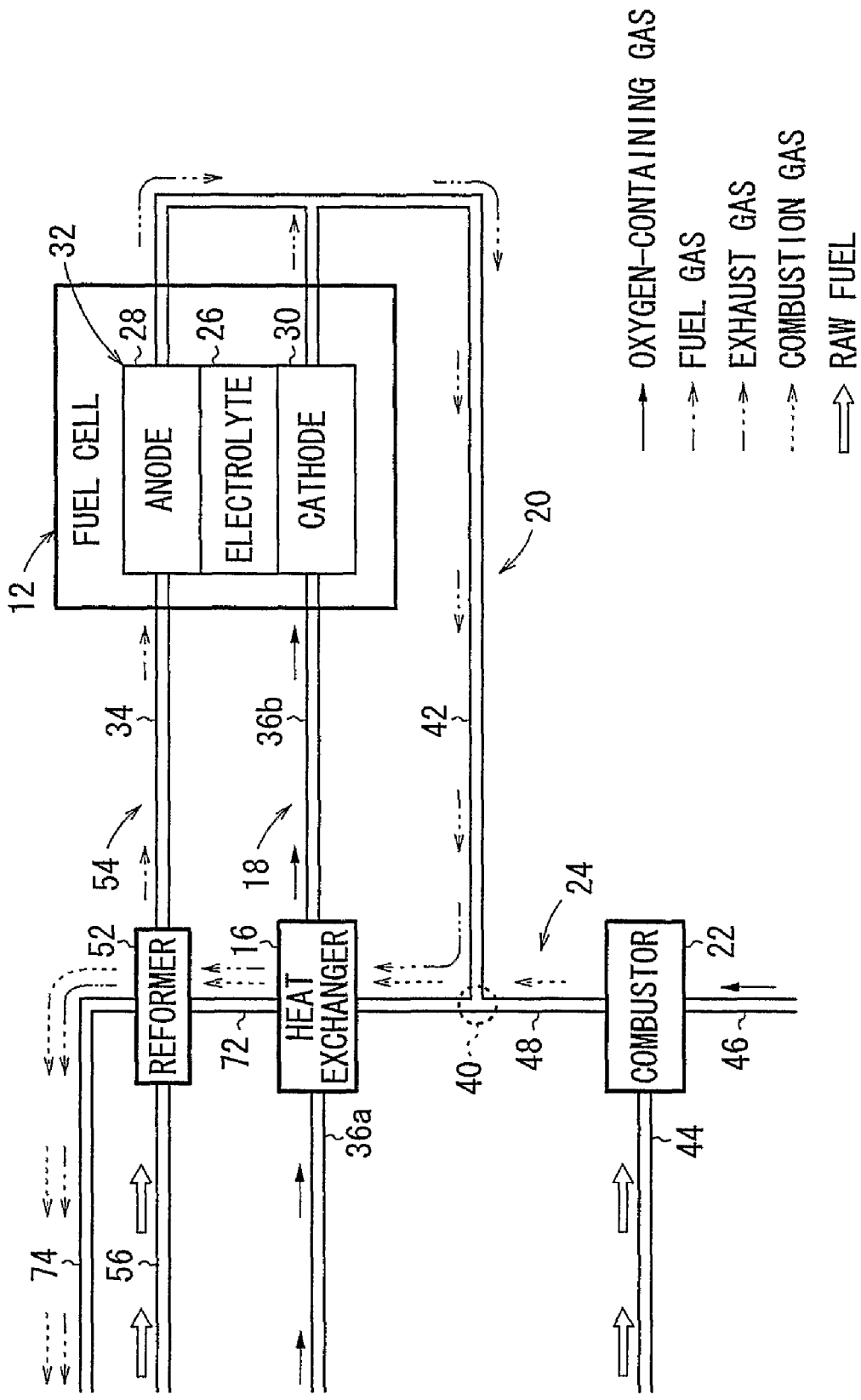
FIG. 4 is a block diagram of a fuel cell system according to a fourth embodiment of the present invention.

FIG. 4 shows in block form a fuel cell system 70 according to a fourth embodiment of the present invention.

As shown in FIG. 4, the fuel cell system 70 has a combustion gas passage 72 for supplying the combustion gas (including the exhaust gas) which has been supplied to the heat exchanger 16 and heated the oxygen-containing gas through a heat exchange, to the reformer 52 for heating the reformer 52, and a discharge passage 74 for discharging the combustion gas which has heated the reformer 52. The reformer 52 can be heated by the heat of the combustion gas after it has heated the oxygen-containing gas in the heat exchanger 16.

According to the fourth embodiment, therefore, the heat of the combustion gas is utilized more efficiently.

Figure 5:
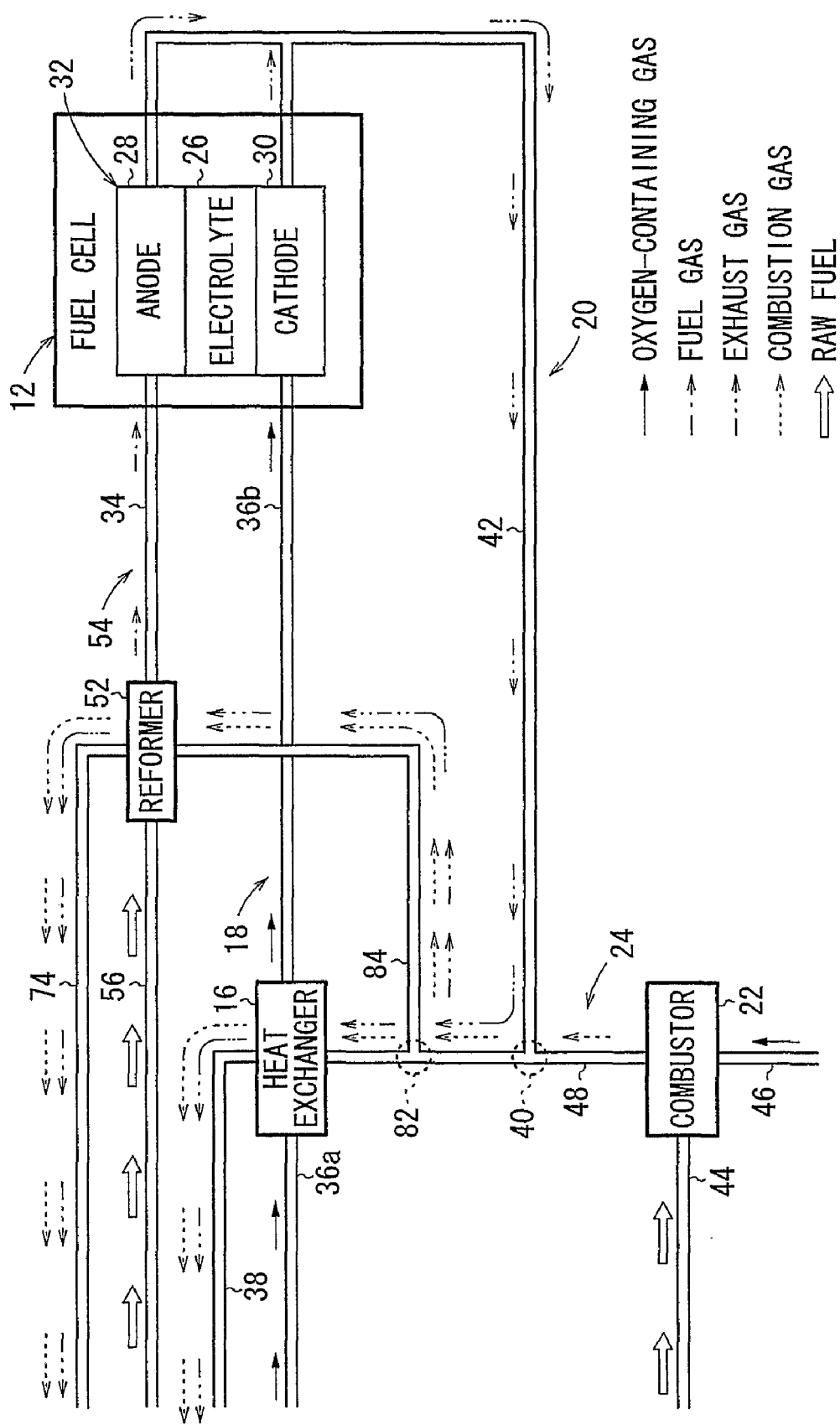
FIG. 5 is a block diagram of a fuel cell system according to a fifth embodiment of the present invention.

FIG. 5 shows in block form a fuel cell system 80 according to a fifth embodiment of the present invention.

As shown in FIG. 5, the fuel cell system 80 has a branch joint 82 disposed in the combustion gas supply passage 48 between the junction 40 and the heat exchanger 16. A branched combustion gas supply passage 84 is branched from the branch joint 82. The branched combustion gas supply passage 84 is connected to the reformer 52 that is connected to the discharge passage 74.

According to the fifth embodiment, a portion of the combustion gas generated by the combustor 22 is supplied to the heat exchanger 16, and the remaining portion of the combustion gas is branched from the branch joint 82 and supplied through the branched combustion gas supply passage 84 to the reformer 52. Therefore, the heat exchanger 16 and the reformer 52 are supplied with respective combustion gases at substantially the same temperature. Consequently, the oxygen-containing gas is favorably heated in the heat exchanger 16, and the reformer 52 is also favorably heated.

Figure 6:
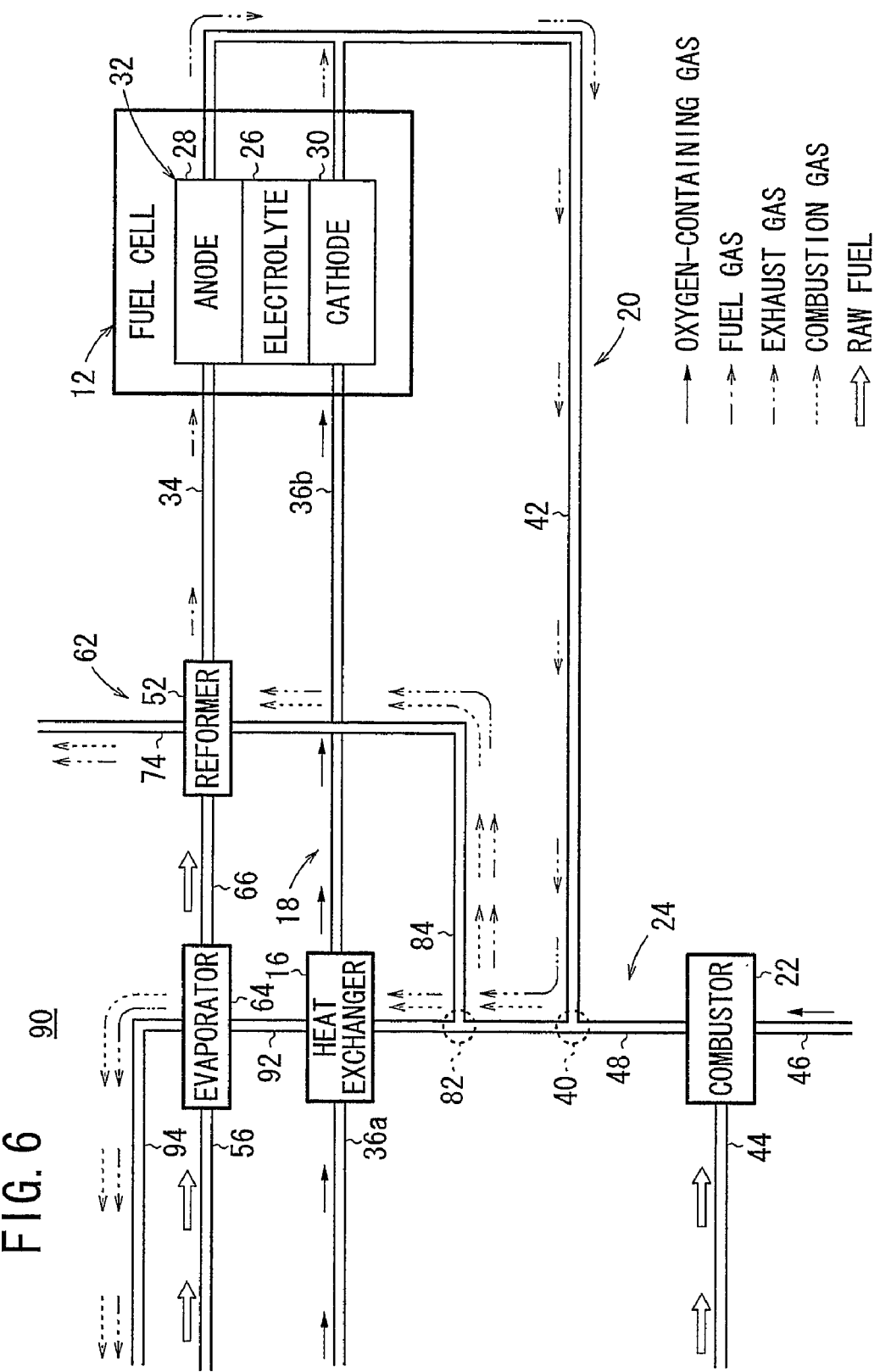
FIG. 6 is a block diagram of a fuel cell system according to a sixth embodiment of the present invention.

FIG. 6 shows in block form a fuel cell system 90 according to a sixth embodiment of the present invention.

As shown in FIG. 6, the fuel cell system 90 has, in addition to the configurations of the fuel cell systems 60, 80 shown in FIGS. 3 and 5, a combustion gas supply passage 92 for supplying the combustion gas discharged from the heat exchanger 16 to the evaporator 64, and a discharge passage 94 for discharging the combustion gas from the evaporator 64.

According to the sixth embodiment, the combustion gas generated by the combustor 22 functions as a heating medium for generating water vapor in the evaporator 64 after having heated the oxygen-containing gas in the heat exchanger 16. The combustion gas branched from the branch joint 82 functions as a heating medium for heating the reformer 52. Therefore, the heat of the exhaust gas is effectively utilized by the heat exchanger 16, the evaporator 64 and the reformer 52 for a better heat utilization ratio.

Figure 7:
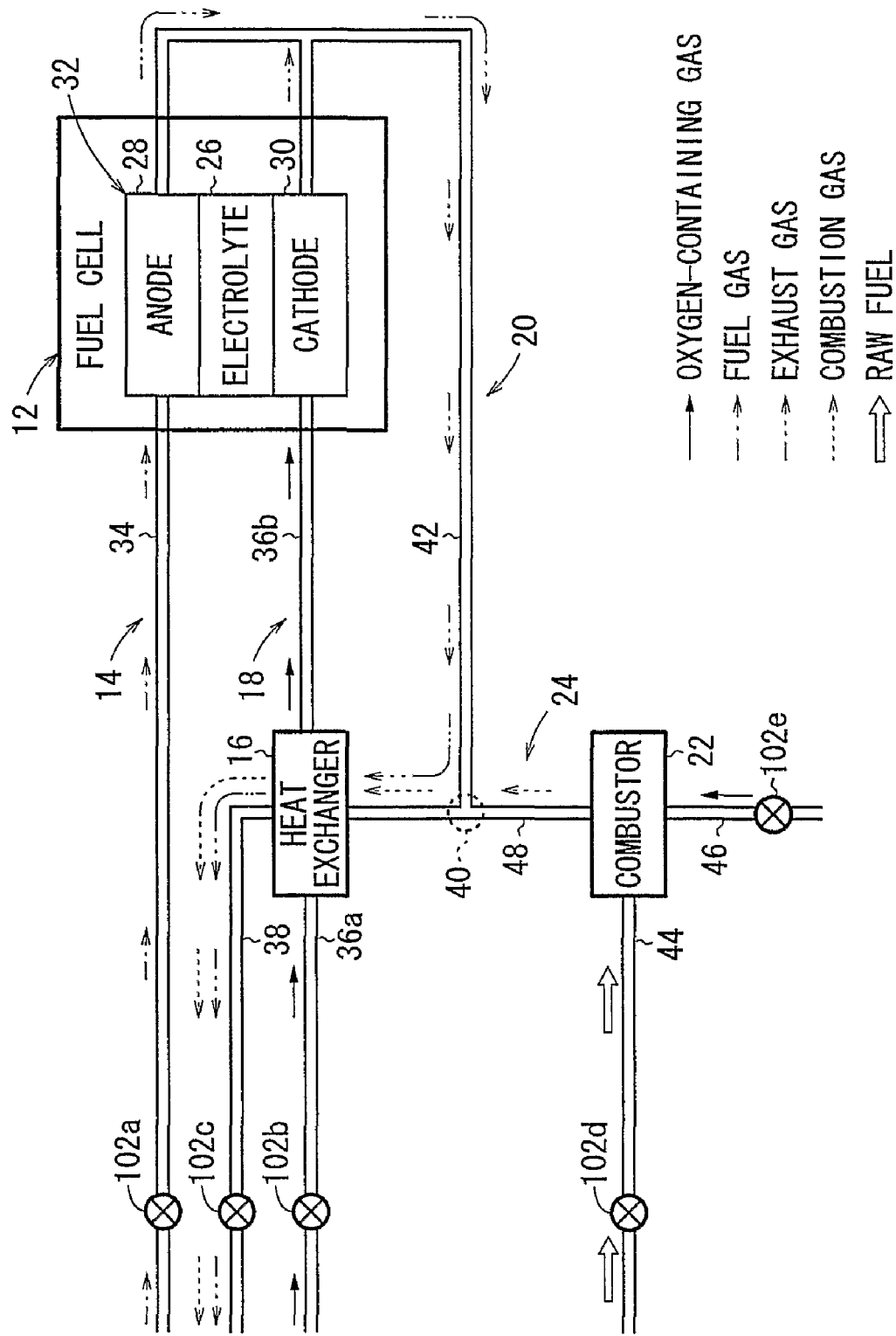
FIG. 7 is a block diagram of a fuel cell system according to a seventh embodiment of the present invention.

FIG. 7 shows in block form a fuel cell system 100 according to a seventh embodiment of the present invention.

As shown in FIG. 7, the fuel cell system 100 has flow rate regulating valves 102a, 102b, 102c, 102d, 102e disposed in the fuel gas supply unit 14, the oxygen containing gas supply unit 18, the exhaust gas discharge unit 20, and the combustion gas supply unit 24. Specifically, the flow rate regulating valve 102a is connected to the fuel gas supply passage 34, the flow rate regulating valves 102b, 102c to the first oxygen-containing gas supply passage 36a and the discharge passage 38, respectively, the flow rate regulating valve 102d to the raw fuel supply passage 44, and the flow rate regulating valve 102e to the oxygen-containing gas supply passage 46.

The flow rate regulating valves 102a through 102e are connected to the fluid passages that are supplied with the fluids before they are heated or the fluid passages that are supplied with the fluids after they are cooled. Specifically, the flow rate regulating valve 102a is connected to the fuel gas supply passage 34 that is supplied with the fuel gas before it is heated, i.e., before it causes the generating reaction in the fuel cell 12. The flow rate regulating valve 102b is connected to the first oxygen-containing gas supply passage 36a that is supplied with the oxygen-containing gas before it is heated, i.e., prior to the heat exchange. The flow rate regulating valves 102d, 102e are connected respectively to the raw fuel supply passage 44 and the oxygen-containing gas supply passage 46 that are supplied with the raw fuel and the oxygen-containing gas before they are heated, i.e., before they are supplied to and combusted in the combustor 22. The flow rate regulating valve 102c is connected to the discharge passage 38 that is supplied with the combustion gas and the exhaust gas after they are cooled, i.e., after their temperature has been lowered by the heat exchange in the heat exchanger 16. The following embodiments also have substantially the same arrangements as above.

In the seventh embodiment, when the flow rate regulating valves 102a, 102b are operated, the flow rates of the fuel gas and the oxygen-containing gas to be supplied to the fuel cell 12 are regulated to control the generation of electric energy in the fuel cell 12 favorably.

When the flow rate regulating valves 102d, 102e are operated, the flow rates of the raw fuel and the oxygen-containing gas to be supplied to the combustor 22 are regulated. Therefore, the combustion gas generated by the combustor 22 can be regulated accurately to a desired temperature for accurately performing a heat exchange between the combustion gas and the oxygen-containing gas in the heat exchanger 16.

When the flow rate regulating valve 102c is operated, the flow rate of the exhaust gas to be introduced into the heat exchanger 16 can be regulated for a higher heat exchange efficiency.

All the flow rate regulating valves 102a through 102e are positioned in a lower-temperature region. Accordingly, the flow rate regulating valves 102a through 102e do not need to be set to a high heat-resistant strength level, and hence can be designed under less strict conditions.

Figure 8:
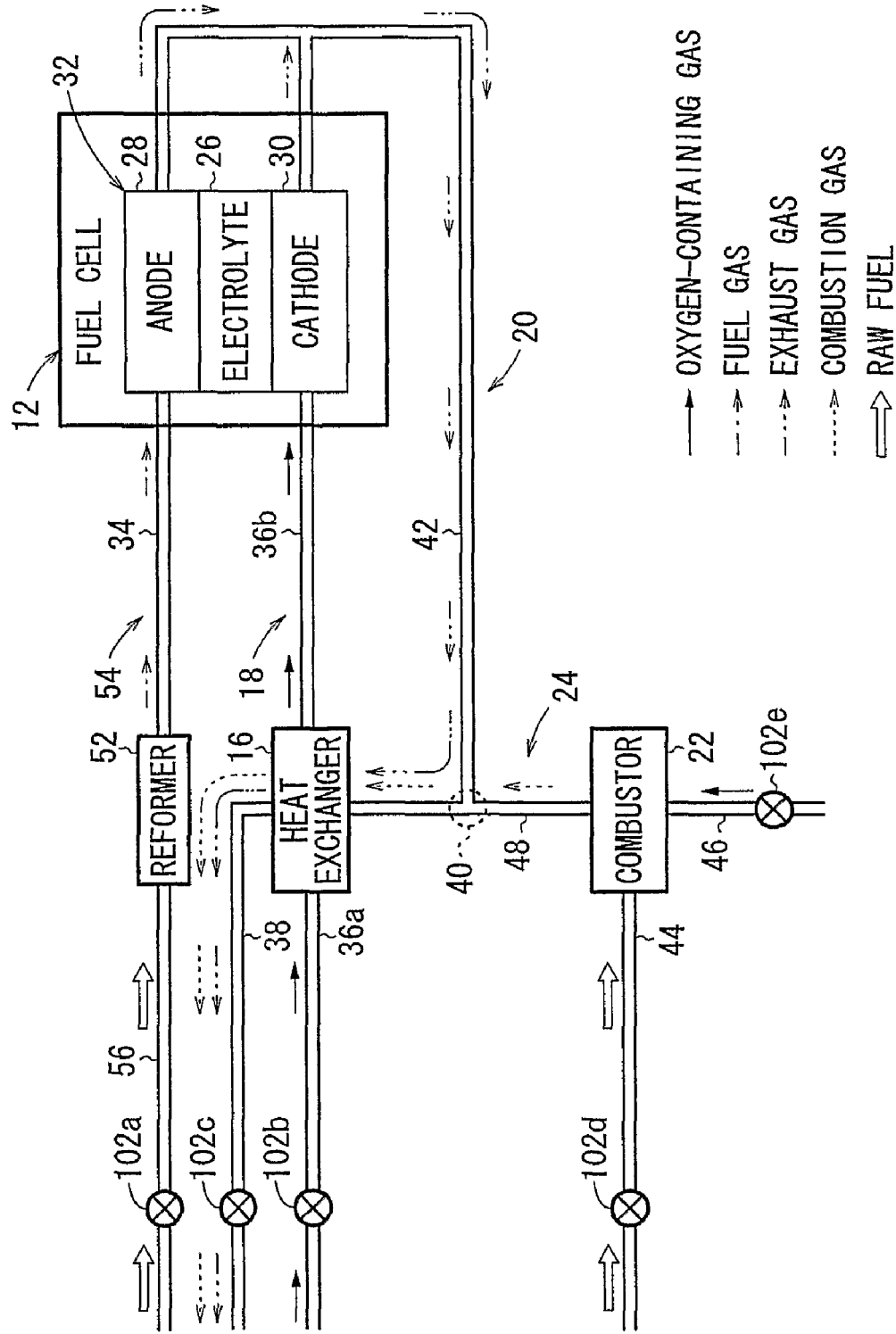
FIG. 8 is a block diagram of a fuel cell system according to an eighth embodiment of the present invention.

FIG. 8 shows in block form a fuel cell system 110 according to an eighth embodiment of the present invention.

In the fuel cell system 110, the flow rate regulating valve 102a is connected to the raw fuel supply passage 56 that is connected to the reformer 52.

Figure 9:
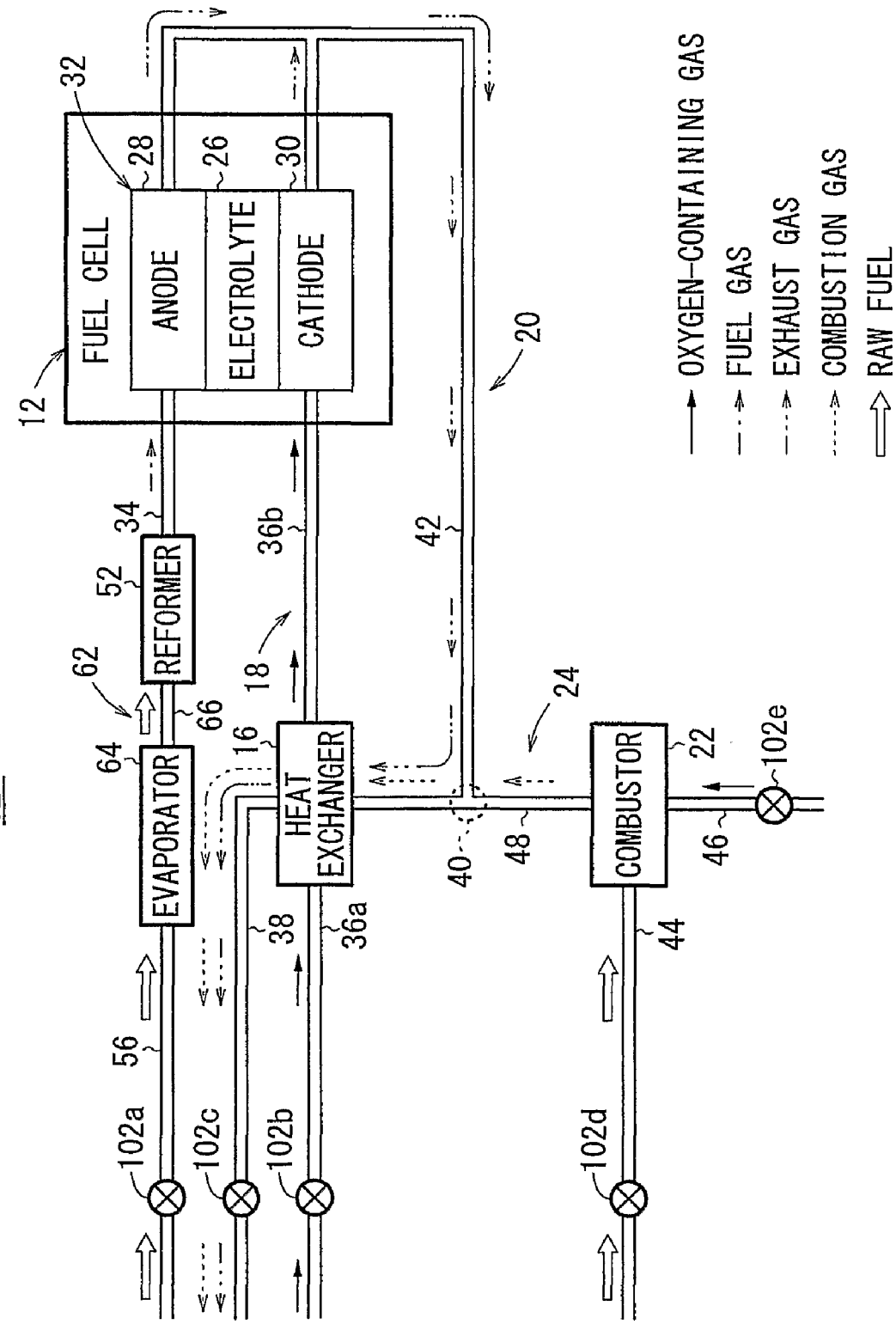
FIG. 9 is a block diagram of a fuel cell system according to a ninth embodiment of the present invention.

FIG. 9 shows in block form a fuel cell system 120 according to a ninth embodiment of the present invention.

In the fuel cell system 120, the flow rate regulating valve 102a is connected to the raw fuel supply passage 56 that is connected to the evaporator 64.

Figure 10:
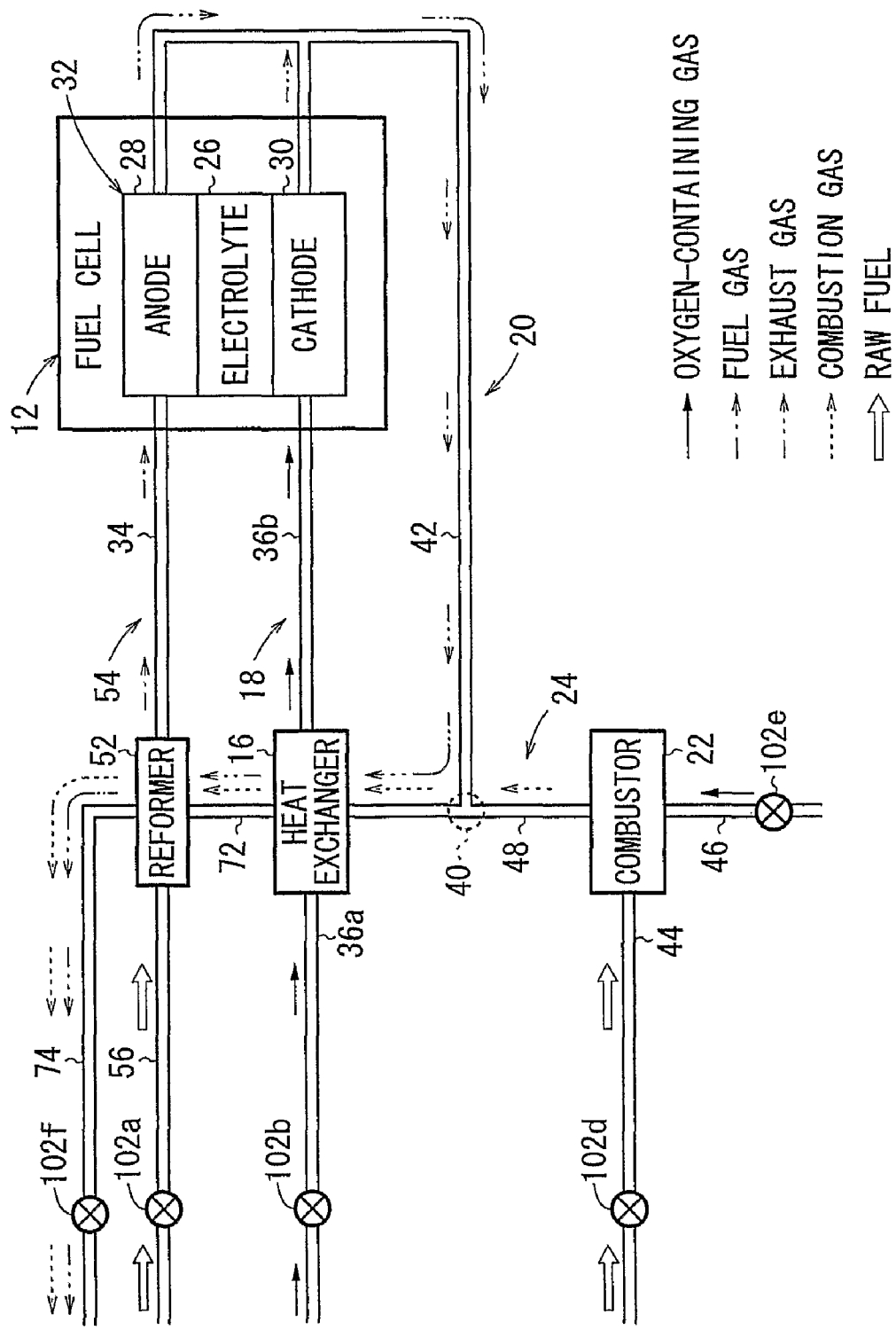
FIG. 10 is a block diagram of a fuel cell system according to a tenth embodiment of the present invention.

FIG. 10 shows in block form a fuel cell system 130 according to a tenth embodiment of the present invention.

In the fuel cell system 130, a flow rate regulating valve 102f is connected to the discharge passage 74 that is connected to the reformer 52.

Figure 11:
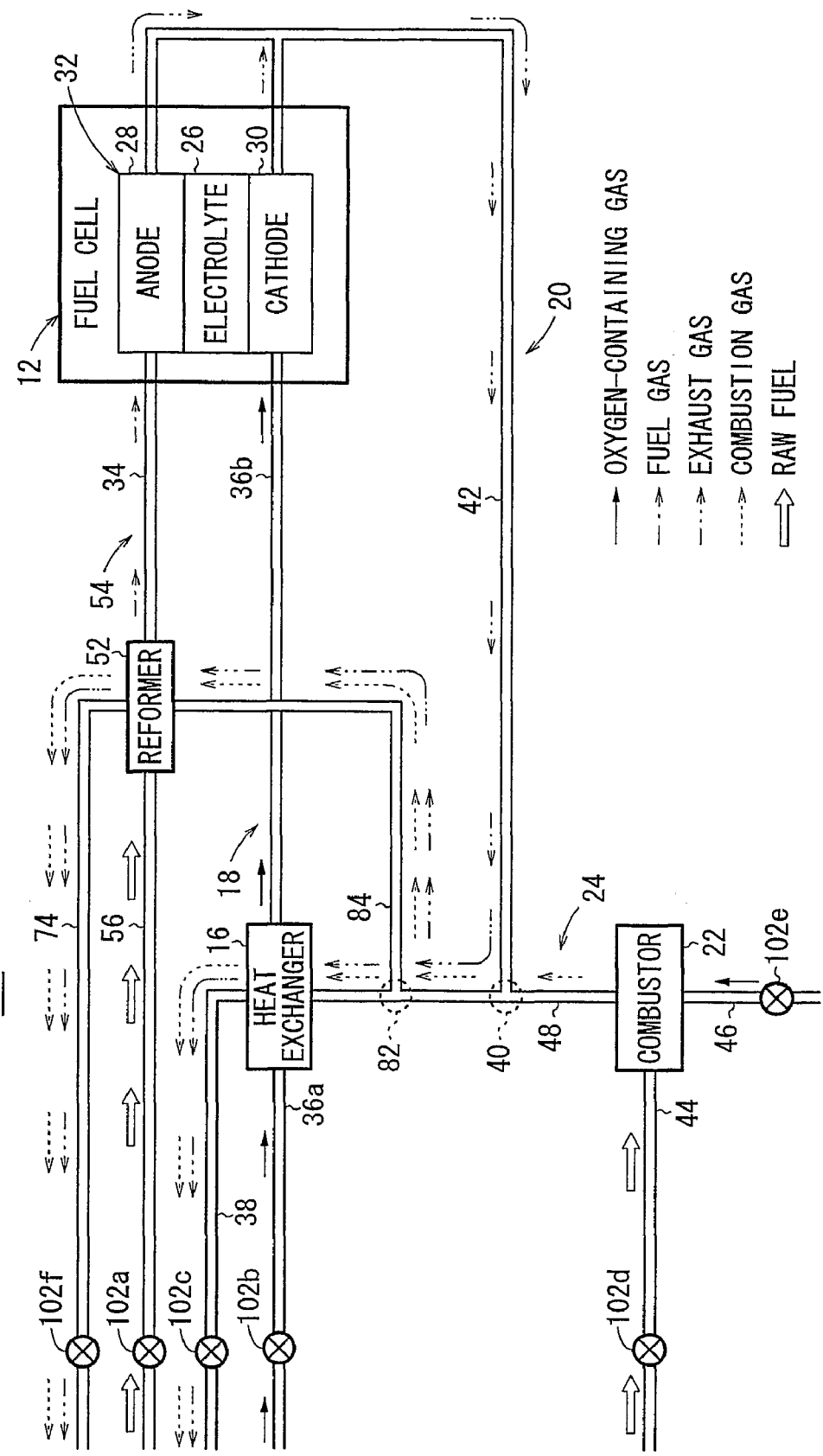
FIG. 11 is a block diagram of a fuel cell system according to an eleventh embodiment of the present invention.

FIG. 11 shows in block form a fuel cell system 140 according to an eleventh embodiment of the present invention.

In the fuel cell system 140, the flow rate regulating valves 102a, 102f are connected respectively to the discharge passage 74 and the raw fuel supply passage 56 that are connected to the reformer 52, and the flow rate regulating valves 102b, 102c are connected respectively to the first oxygen-containing gas supply passage 36a and the discharge passage 38 that are connected to the heat exchanger 16.

Figure 12:
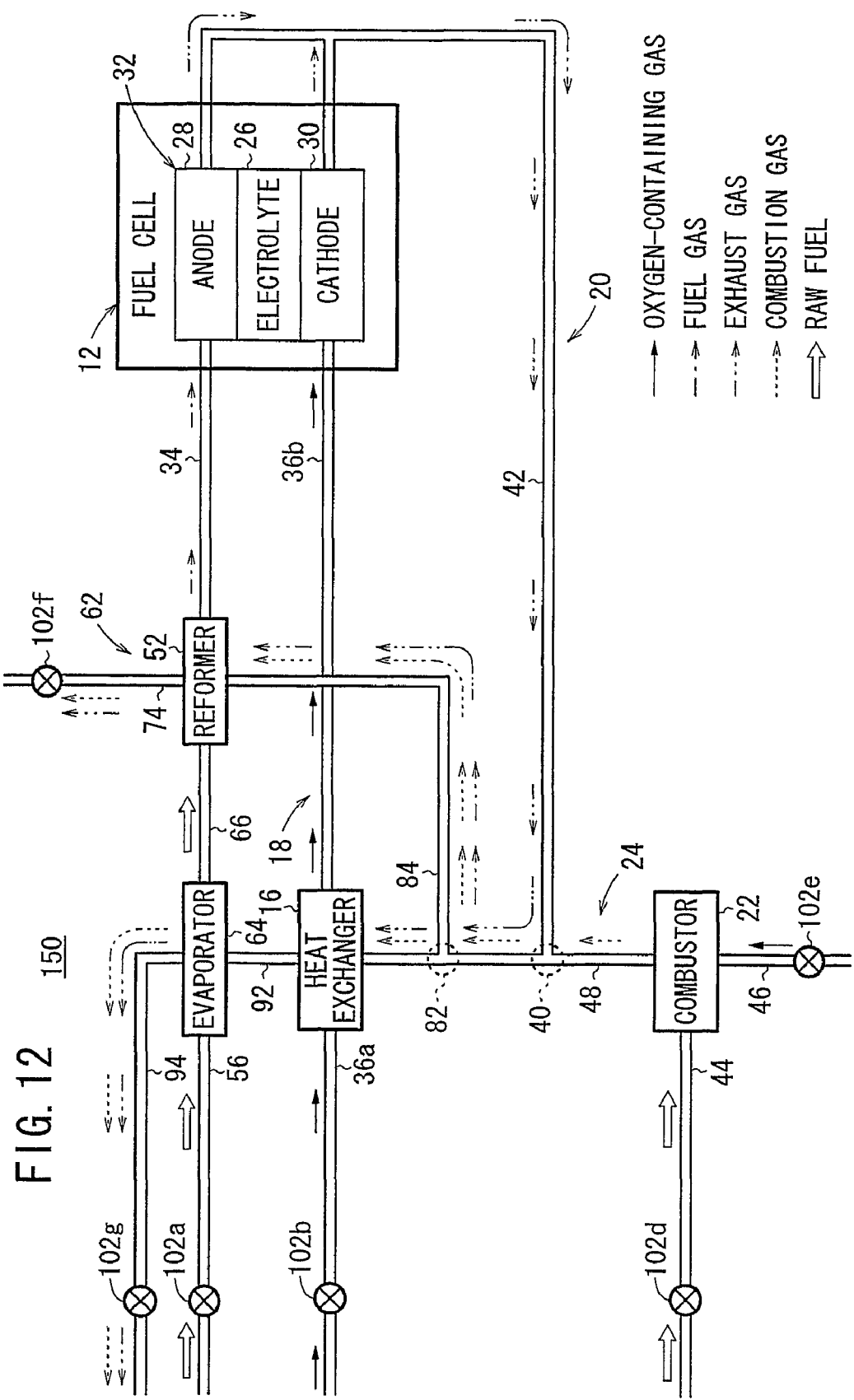
FIG. 12 is a block diagram of a fuel cell system according to a twelfth embodiment of the present invention.

FIG. 12 shows in block form a fuel cell system 150 according to a twelfth embodiment of the present invention.

In the fuel cell system 150, a flow rate regulating valve 102g is connected to the discharge passage 94 that is connected to the evaporator 64.

The fuel cell systems 110, 120, 130, 140, 150 according to the eighth through twelfth embodiments offer the same advantages as those of the fuel cell system 100 according to the seventh embodiment.

Figure 13:
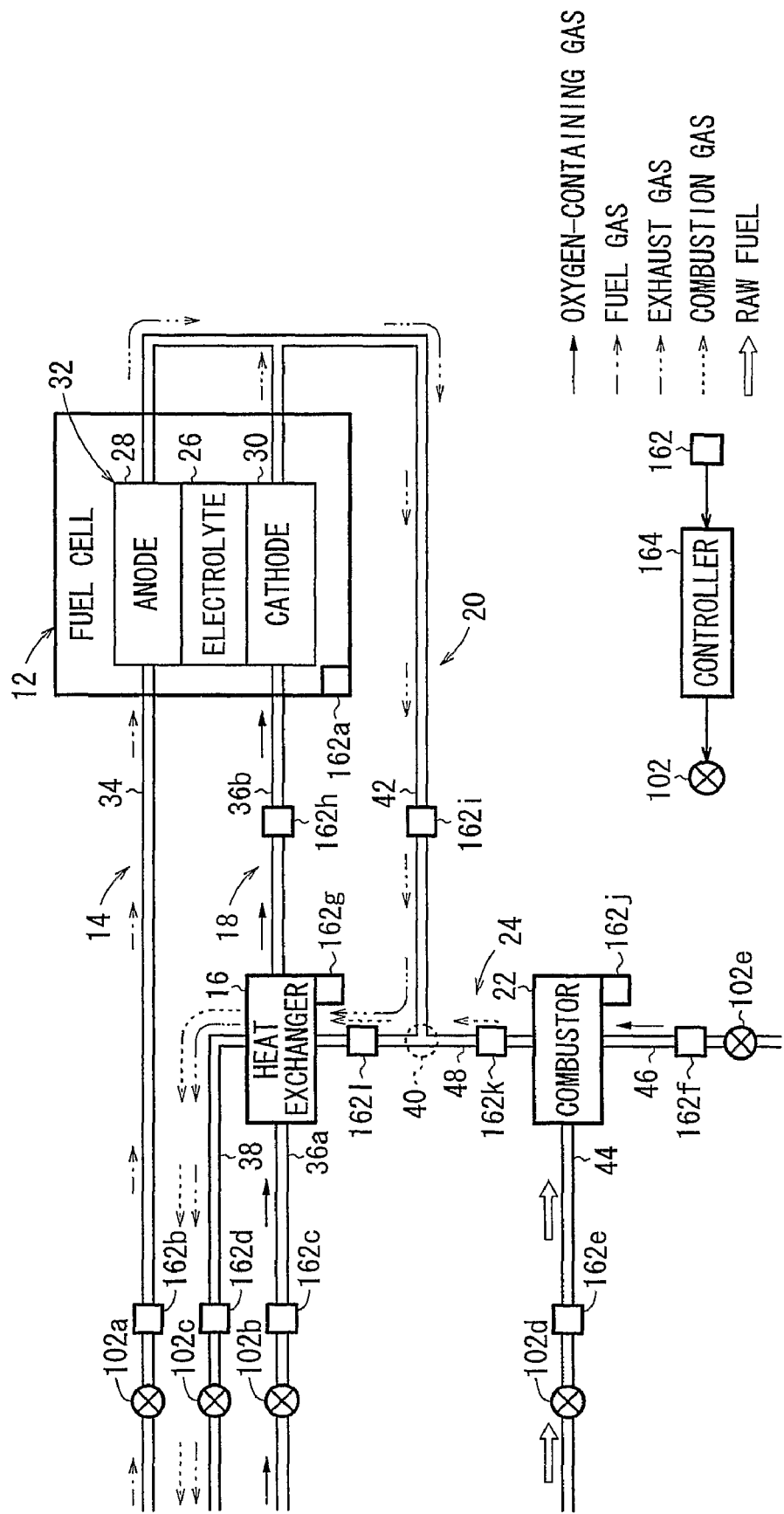
FIG. 13 is a block diagram of a fuel cell system according to a thirteenth embodiment of the present invention.

FIG. 13 shows in block form a fuel cell system 160 according to a thirteenth embodiment of the present invention.

As shown in FIG. 13, the fuel cell system 160 has temperature detectors 162a through 162l disposed on the fuel cell 12, the fuel gas supply unit 14, the oxygen containing gas supply unit 18, the exhaust gas discharge unit 20, and the combustion gas supply unit 24.

The temperature detector 162a is disposed on the fuel cell 12 for detecting the temperature of a given region in the fuel cell 12. The temperature detectors 162b through 162f are disposed closely to the flow rate regulating valves 102a through 102e, respectively. The temperature detector 162g is disposed on the heat exchanger 16, and the temperature detector 162h is disposed on the second oxygen-containing gas supply passage 36b.

The temperature detector 162i is disposed on the exhaust gas supply passage 42, and the temperature detector 162j is disposed on the combustor 22. The temperature detectors 162k, 162l are disposed on the combustion gas supply passage 48 on each side of the junction 40.

The temperature detectors 162a through 162l are connected to a controller 164, which controls the flow rate regulating valves 102a through 102e based on the temperatures detected by the temperature detectors 162a through 162l.

In FIG. 13, the flow rate regulating valves 102a through 102e that are connected to the controller 164 are denoted by the reference numeral 102 alone, and the temperature detectors 162a through 162l that are connected to the controller 164 are denoted by the reference numeral 162 alone. The flow rate regulating valves and the temperature detectors in the other embodiments to be described below are similarly denoted.

When the fuel cell system 160 starts to operate, the combustor 22 generates the combustion gas from the raw fuel and the oxygen-containing gas supplied thereto, and the combustion gas is mixed with the exhaust gas discharged from the fuel cell 12 and then is supplied to the heat exchanger 16. Since the oxygen-containing gas is heated in the heat exchanger 16, the temperature of the fuel cell 12 is increased by the heat of the oxygen-containing gas.

At this time, the temperature detectors 162 (162a through 162l) detect the temperature of the fuel cell 12 and fluid temperatures (the fuel gas temperature, the oxygen-containing gas temperature, the raw fuel temperature, the combustion gas temperature, and the exhaust gas temperature). These detected temperatures are transmitted to the controller 164, which controls the flow rate regulating valves 102 (102a through 102e) for thereby controlling the flow rate of at least one of the fuel gas, the oxygen-containing gas, the raw fuel, the combustion gas, and the exhaust gas.

When the temperature of the fuel cell 12 reaches a predetermined normal operating temperature, the controller 164 regulates the flow rate of at least one of the fuel gas, the oxygen-containing gas, the raw fuel, the combustion gas, and the exhaust gas in order to keep the temperatures detected by the temperature detectors 162 in a certain temperature range. Therefore, while the fuel cell system 160 is in normal operation, the fuel cell 12 is maintained at a constant temperature at all times for efficient electric power generation.

Figure 14:
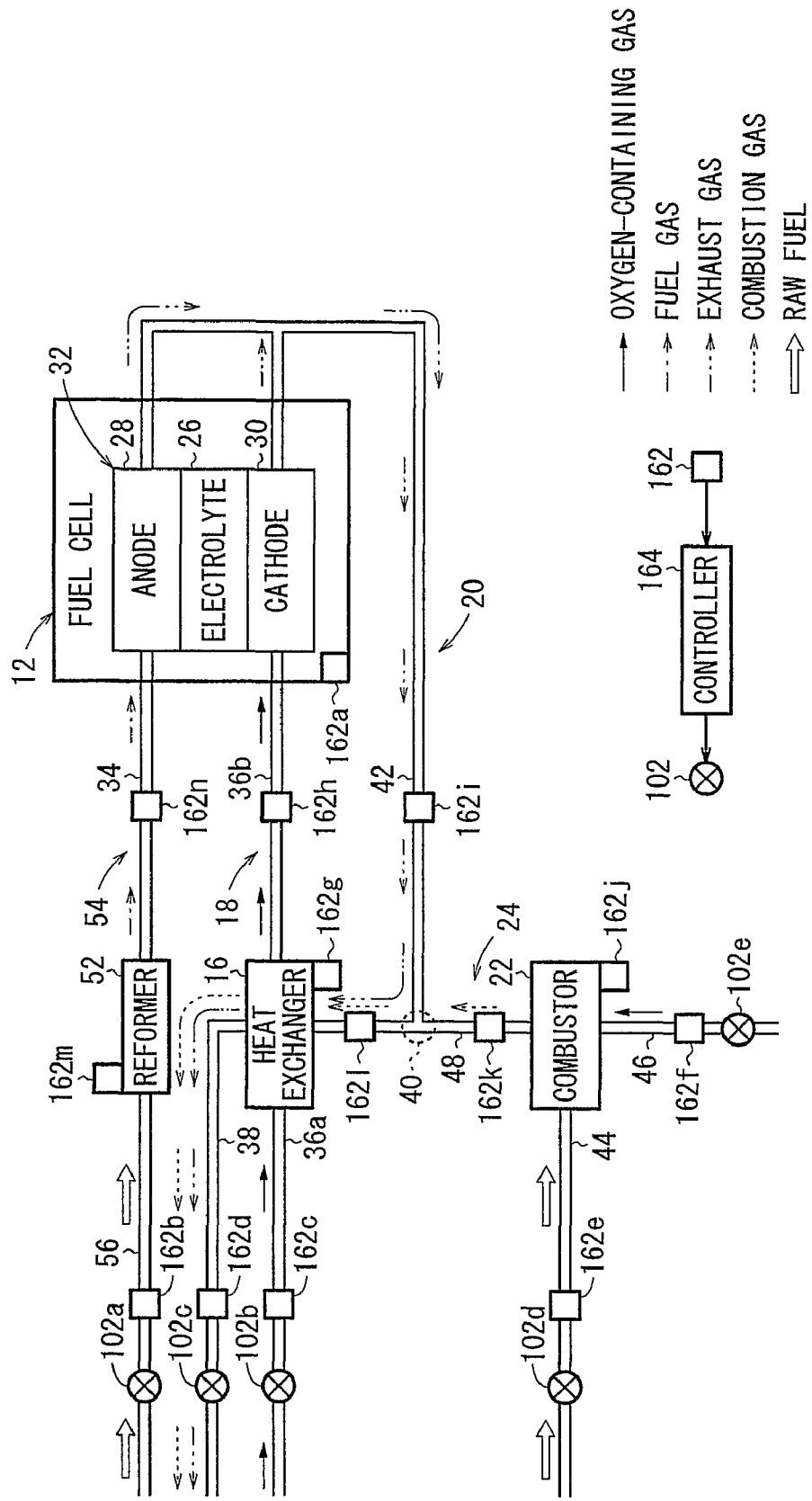
FIG. 14 is a block diagram of a fuel cell system according to a fourteenth embodiment of the present invention.

FIG. 14 shows in block form a fuel cell system 170 according to a fourteenth embodiment of the present invention.

The fuel cell system 170 has a temperature detector 162m disposed on the reformer 52, and a temperature detector 162n disposed on the fuel gas supply passage 34 downstream of the reformer 52.

Figure 15:
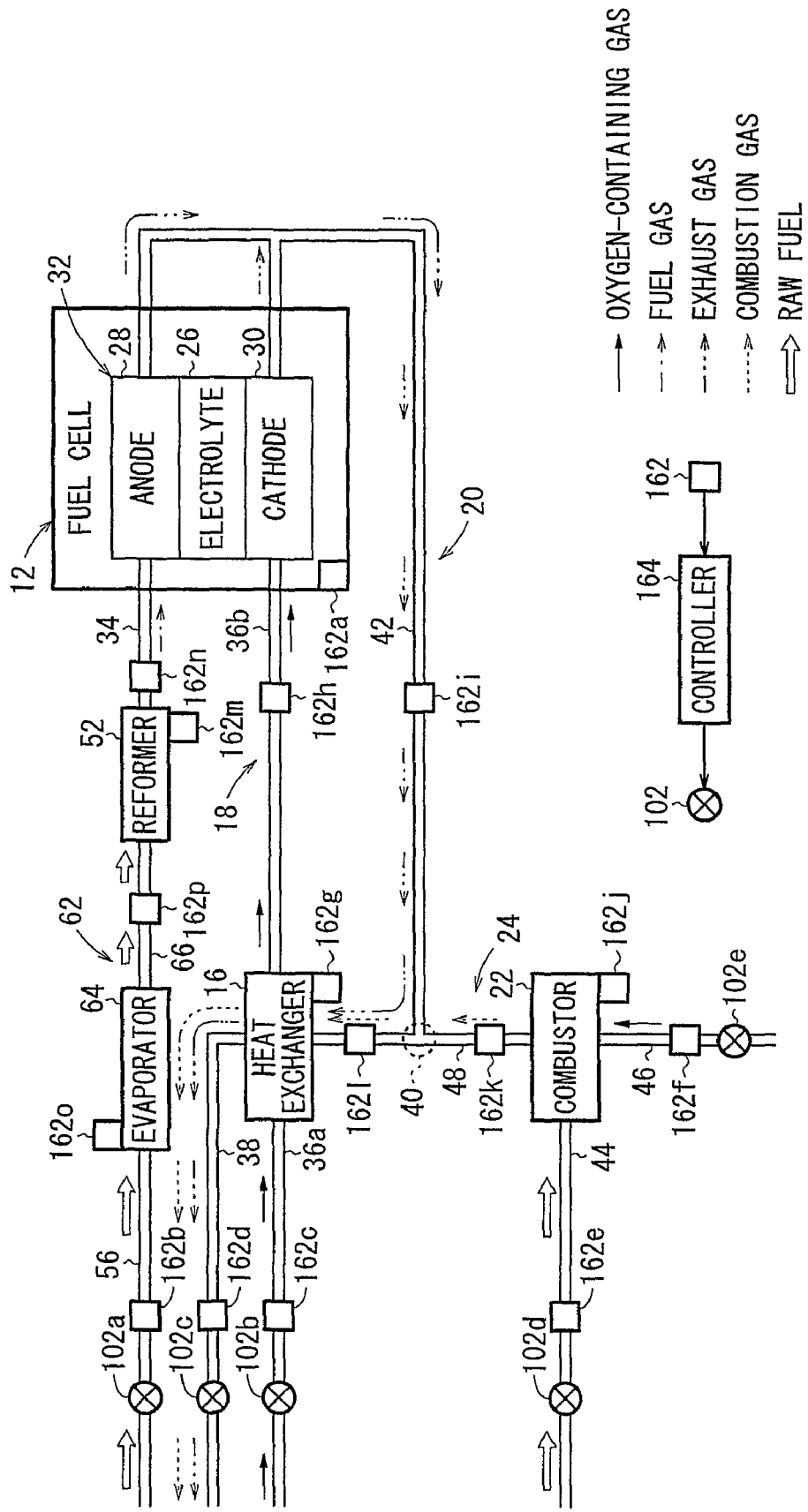
FIG. 15 is a block diagram of a fuel cell system according to a fifteenth embodiment of the present invention.

FIG. 15 shows in block form a fuel cell system 180 according to a fifteenth embodiment of the present invention.

The fuel cell system 180 has a temperature detector 162o disposed on the evaporator 64, and a temperature detector 162p disposed on the mixed fuel supply passage 66 between the evaporator 64 and the reformer 52.

Figure 16:
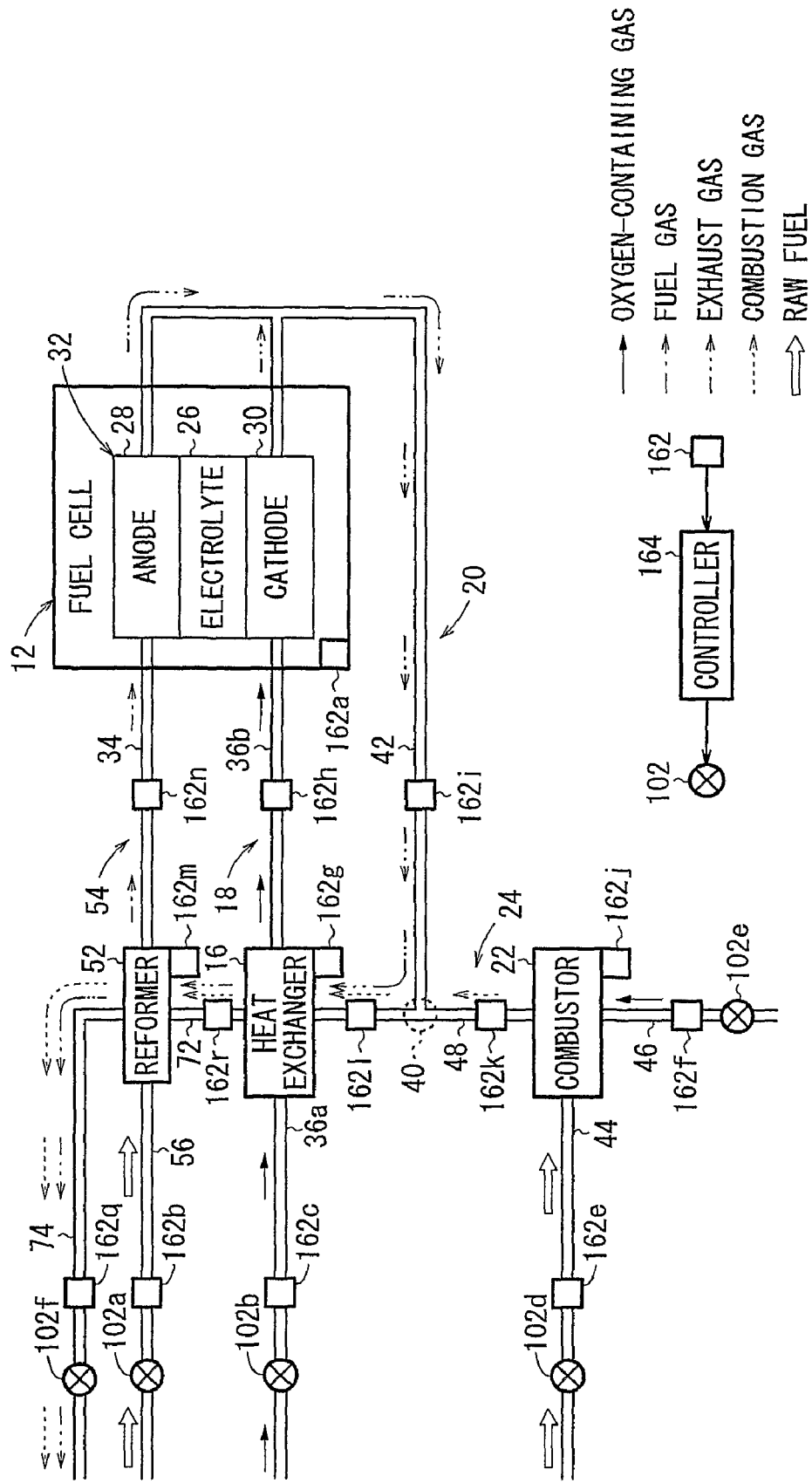
FIG. 16 is a block diagram of a fuel cell system according to a sixteenth embodiment of the present invention.

FIG. 16 shows in block form a fuel cell system 190 according to a sixteenth embodiment of the present invention.

The fuel cell system 190 has a temperature detector 162q disposed on the discharge passage 74 connected to the reformer 52, and a temperature detector 162r disposed on the combustion gas passage 72 between the heat exchanger 16 and the reformer 52.

Figure 17:
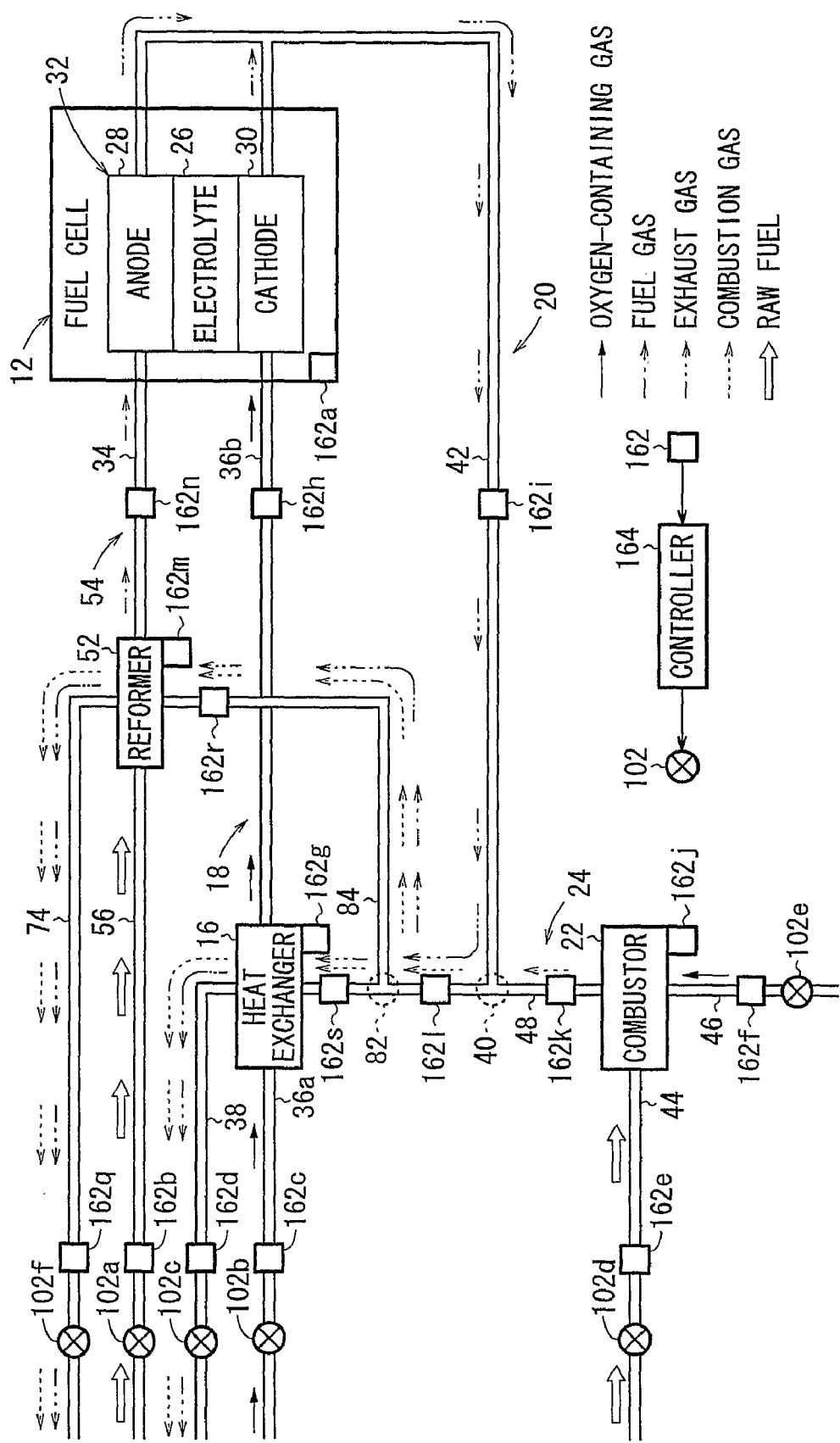
FIG. 17 is a block diagram of a fuel cell system according to a seventeenth embodiment of the present invention.

FIG. 17 shows in block form a fuel cell system 200 according to a seventeenth embodiment of the present invention.

The fuel cell system 200 has the branch joint 82 and a temperature detector 162s disposed on the combustion gas supply passage 48 between the branch joint 82 and the heat exchanger 16.

Figure 18:
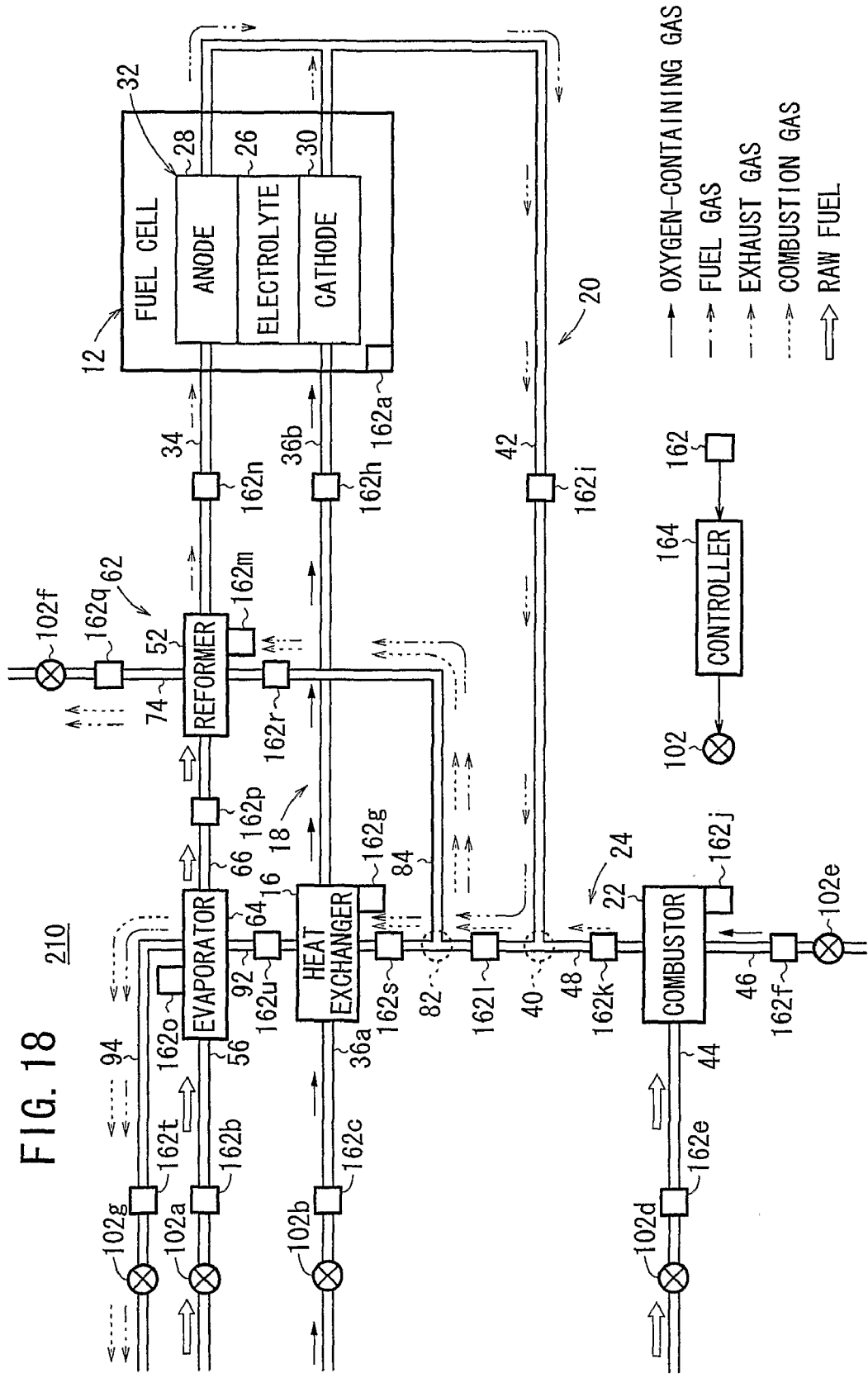
FIG. 18 is a block diagram of a fuel cell system according to an eighteenth embodiment of the present invention.

FIG. 18 shows in block form a fuel cell system 210 according to an eighteenth embodiment of the present invention.

The fuel cell system 210 has a temperature detector 162t disposed on the discharge passage 94 connected to the evaporator 64, and a temperature detector 162u disposed on the combustion gas supply passage 92.

The fuel cell systems 170, 180, 190, 200, 210 according to the fourteenth through eighteenth embodiments offer the same advantages as those of the fuel cell system 160 according to the thirteenth embodiment.

Figure 19:
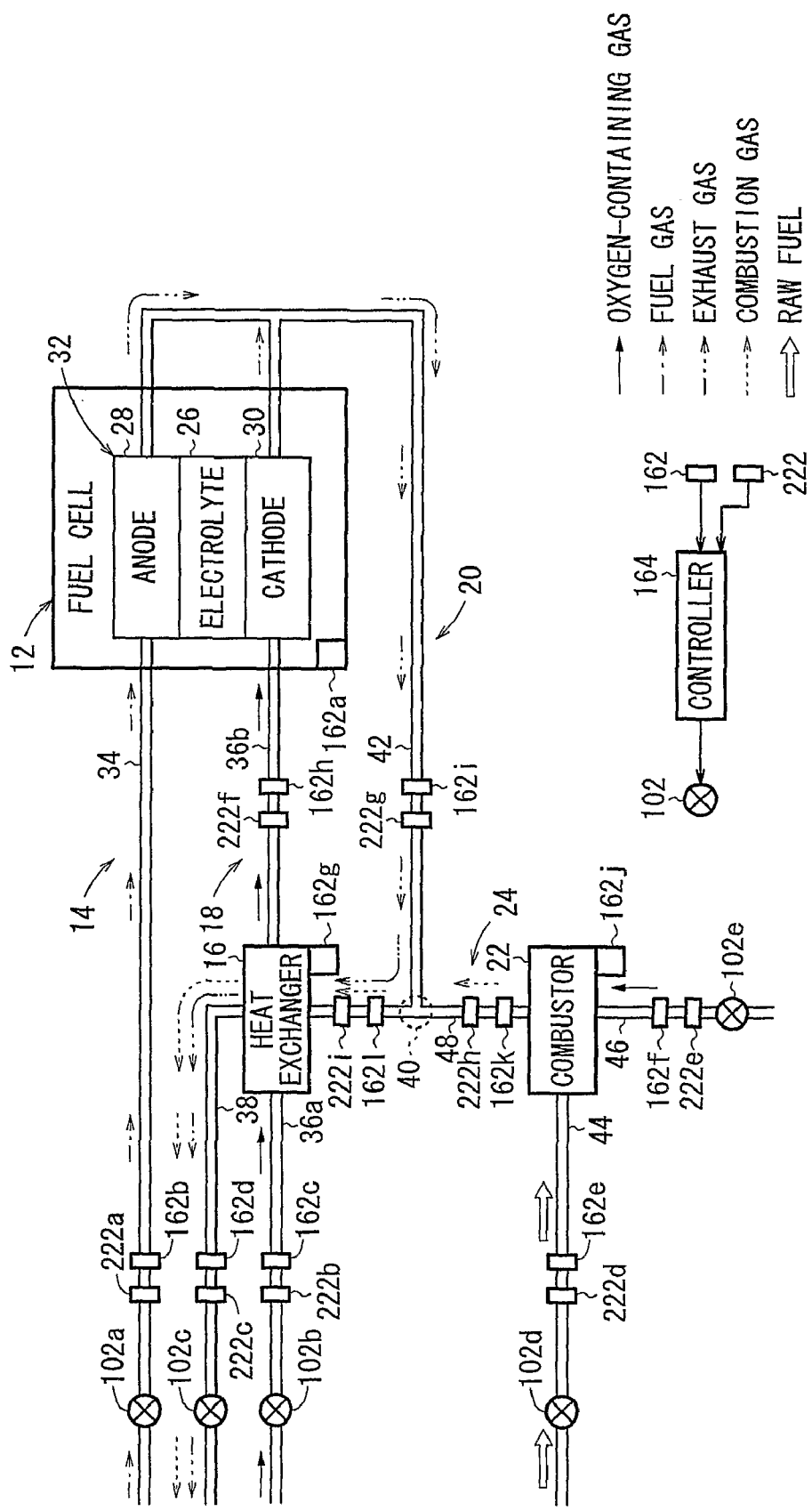
FIG. 19 is a block diagram of a fuel cell system according to a nineteenth embodiment of the present invention.

FIG. 19 shows in block form a fuel cell system 220 according to a nineteenth embodiment of the present invention.

The fuel cell system 220 has flow rate detectors 222a through 222e (hereinafter referred to as flow rate detectors 222) disposed closely to the temperature detectors 162b through 162f (hereinafter referred to as temperature detectors 162), and flow rate detectors 222f through 222i (hereinafter referred to as flow rate detectors 222) disposed closely to the temperature detectors 162h, 162i, 162k, 162l (hereinafter referred to as temperature detectors 162). The flow rate detectors 222 are connected to the controller 164, and input flow rates detected thereby to the controller 164.

In the fuel cell system 220, the temperature detectors 162 detect the temperatures of given regions in the fuel cell system 220, and the flow rate detectors 222 detect the flow rates of the fuel gas, the oxygen-containing gas, the raw fuel, the combustion gas, and the exhaust gas in the fuel cell system 220. The controller 164 controls the flow rate regulating valves 102 based on the temperature information detected by the temperature detectors 162 and the flow rate information detected by the flow rate detectors 222.

Consequently, the temperature of the fuel cell 12 can quickly and reliably be increased when the fuel cell system 220 starts to operate, and the temperature of the fuel cell 12 can be controlled highly accurately while the fuel cell system 220 is in normal operation for efficient and effective electric power generation.

Figure 20:
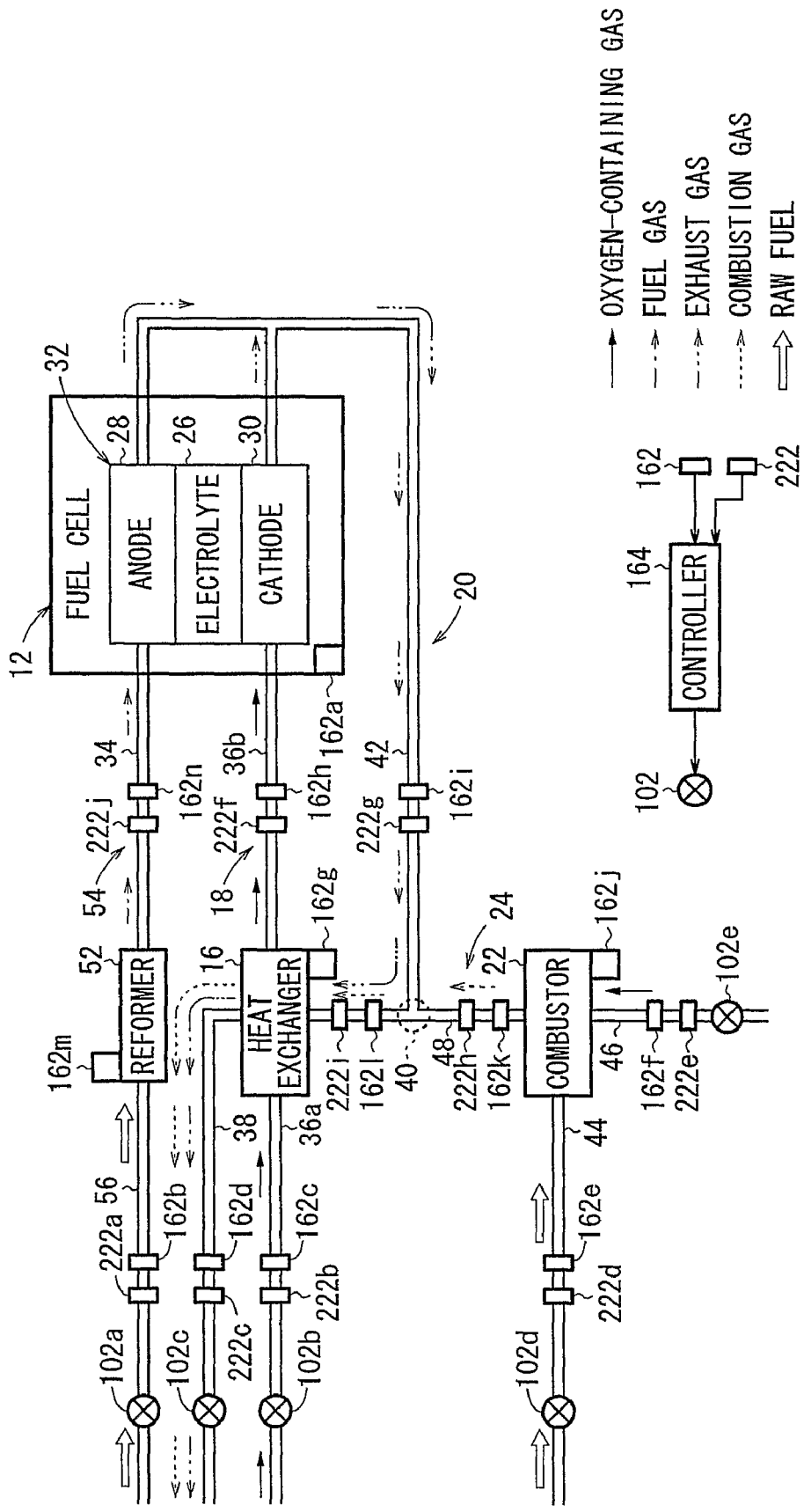
FIG. 20 is a block diagram of a fuel cell system according to a twentieth embodiment of the present invention.

FIG. 20 shows in block form a fuel cell system 230 according to a twentieth embodiment of the present invention.

The fuel cell system 230 has a flow rate detector 222j disposed closely to the temperature detector 162n.

Figure 21:
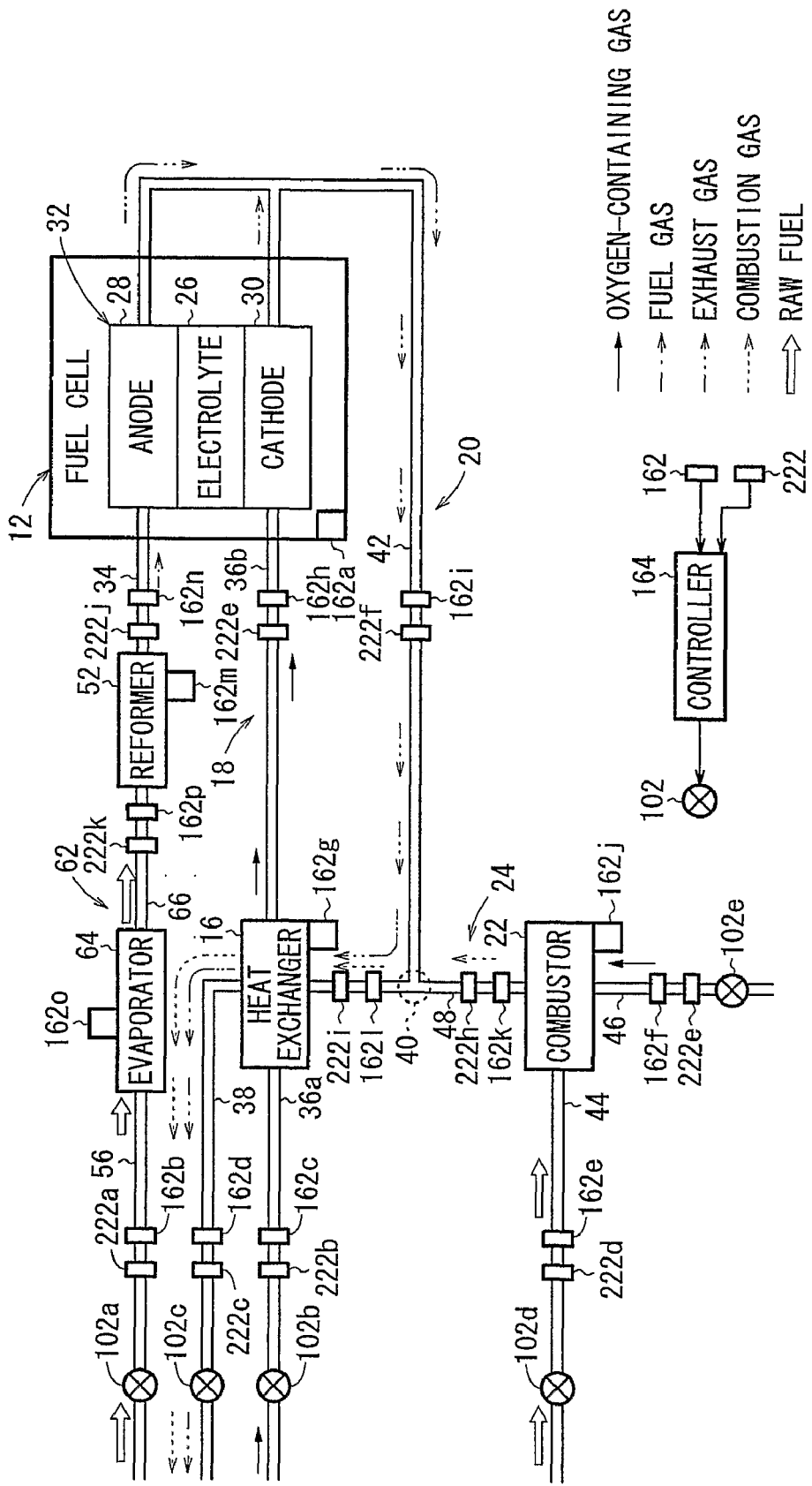
FIG. 21 is a block diagram of a fuel cell system according to a twenty-first embodiment of the present invention.

FIG. 21 shows in block form a fuel cell system 240 according to a twenty-first embodiment of the present invention.

The fuel cell system 240 has a flow rate detector 222k disposed closely to the temperature detector 162p.

Figure 22:
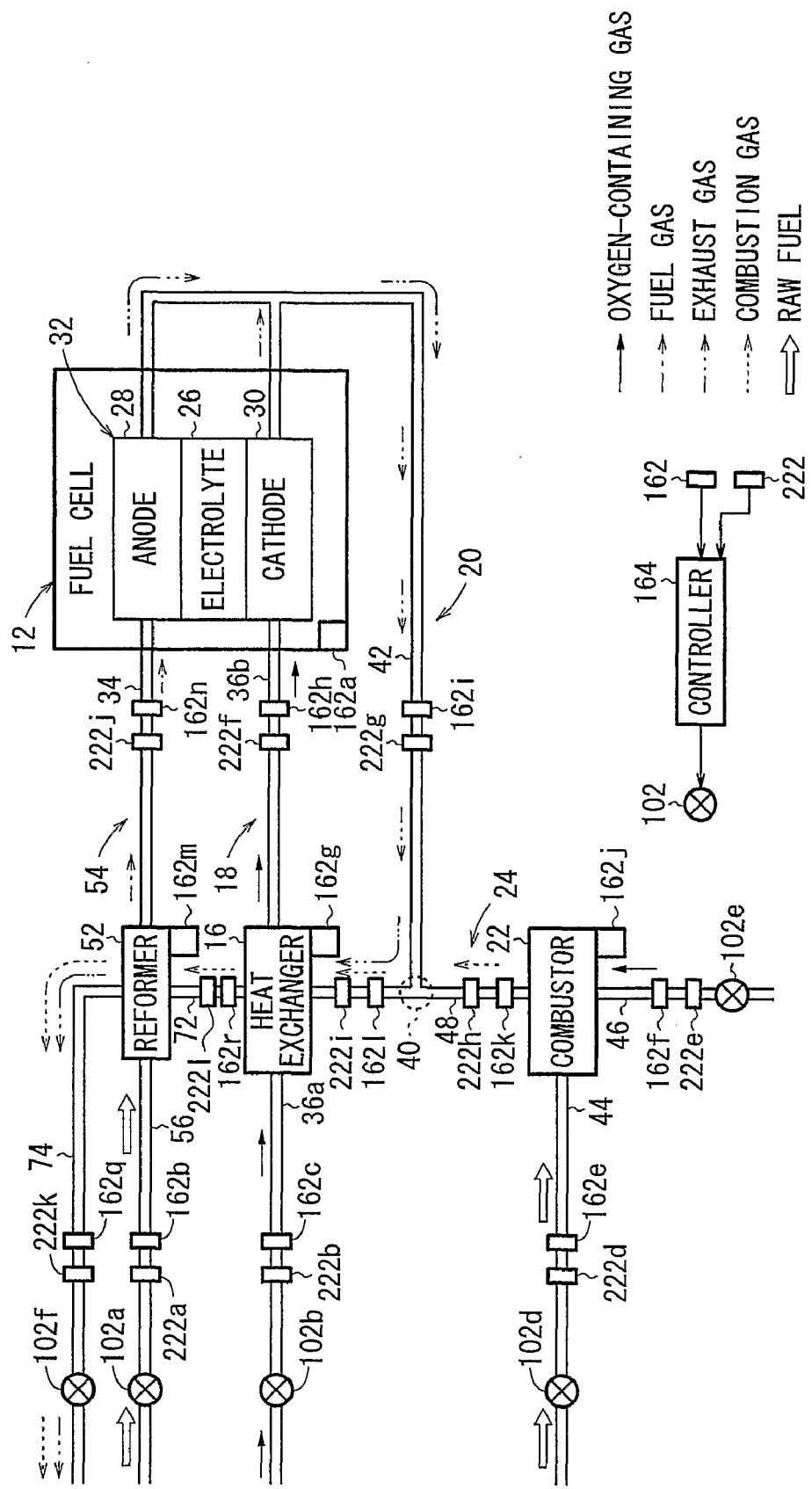
FIG. 22 is a block diagram of a fuel cell system according to a twenty-second embodiment of the present invention.

FIG. 22 shows in block form a fuel cell system 250 according to a twenty-second embodiment of the present invention.

The fuel cell system 250 has a flow rate detector 222l disposed closely to the temperature detector 162r.

Figure 23:
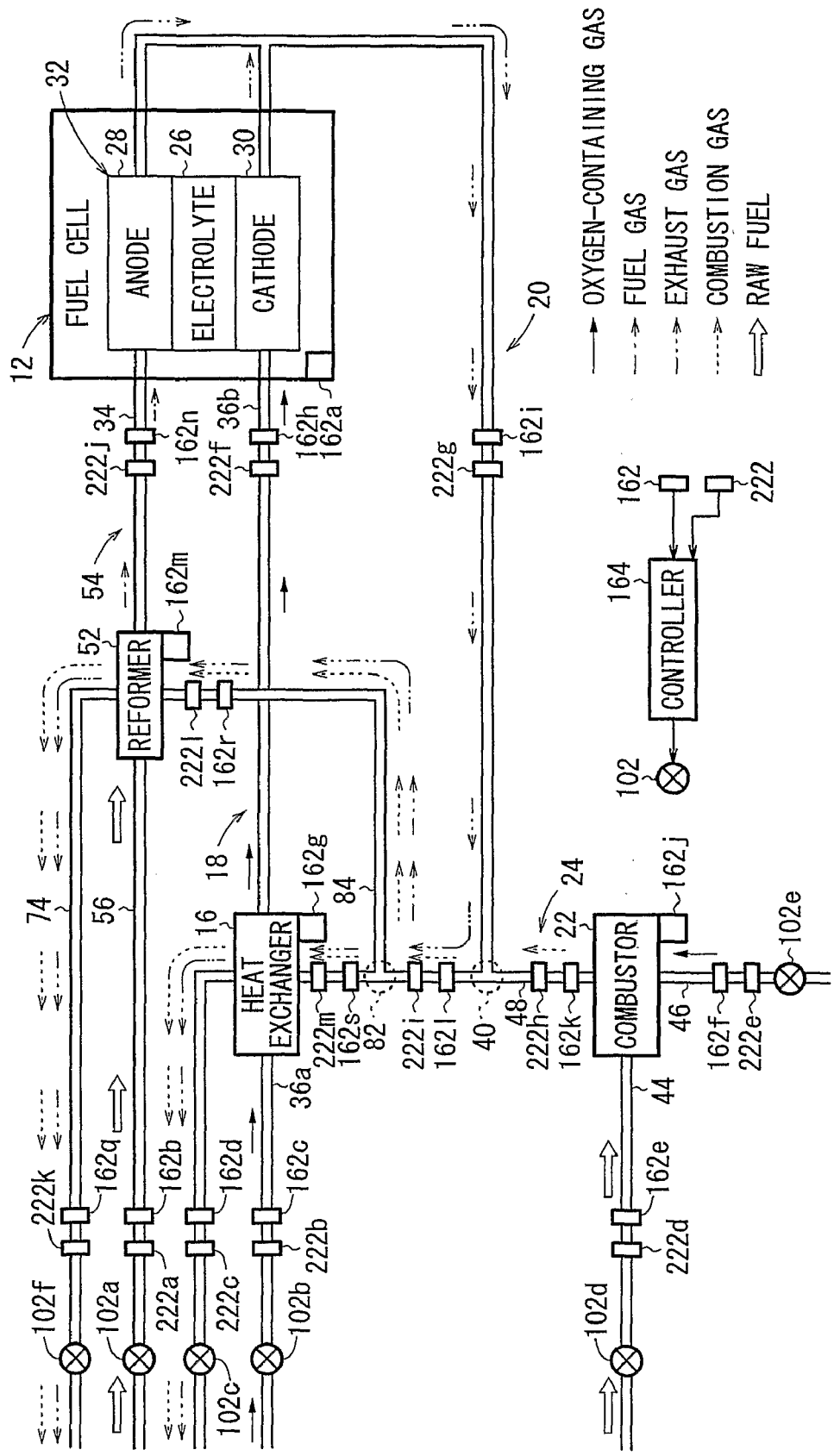
FIG. 23 is a block diagram of a fuel cell system according to a twenty-third embodiment of the present invention.

FIG. 23 shows in block form a fuel cell system 260 according to a twenty-third embodiment of the present invention.

The fuel cell system 260 has a flow rate detector 222m disposed closely to the temperature detector 162s.

Figure 24:
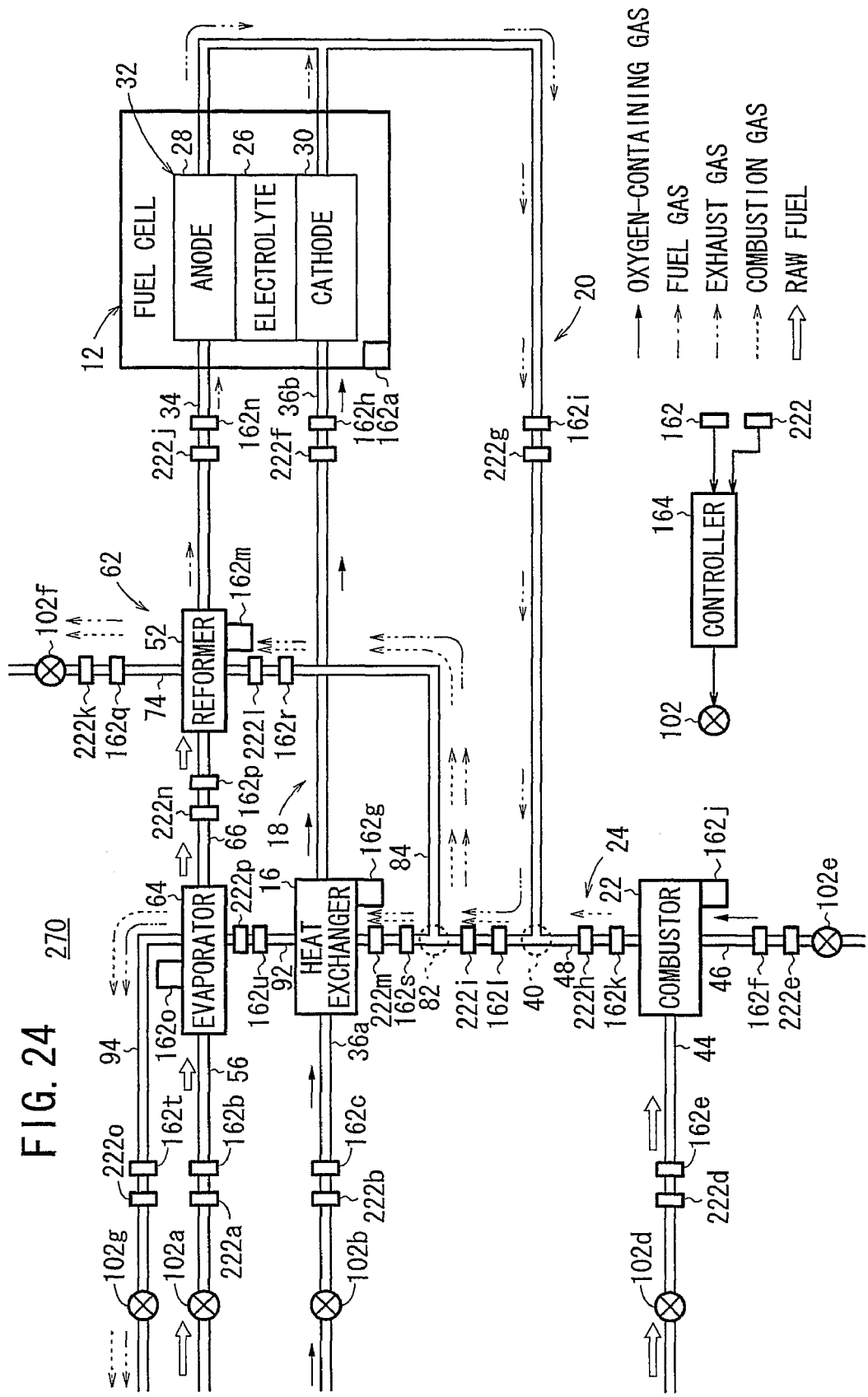
FIG. 24 is a block diagram of a fuel cell system according to a twenty-fourth embodiment of the present invention.

FIG. 24 shows in block form a fuel cell system 270 according to a twenty-fourth embodiment of the present invention.

The fuel cell system 270 has a flow rate detector 222*n* disposed closely to the temperature detector 162*p*, a flow rate detector 222*o* disposed closely to the temperature detector 162*t*, and a flow rate detector 222*p* disposed closely to the temperature detector 162*u*.

The fuel cell systems 230, 240, 250, 260, 270 according to the twentieth through twenty-fourth embodiments offer the same advantages as those of the fuel cell system 220 according to the nineteenth embodiment.

Figure 25:
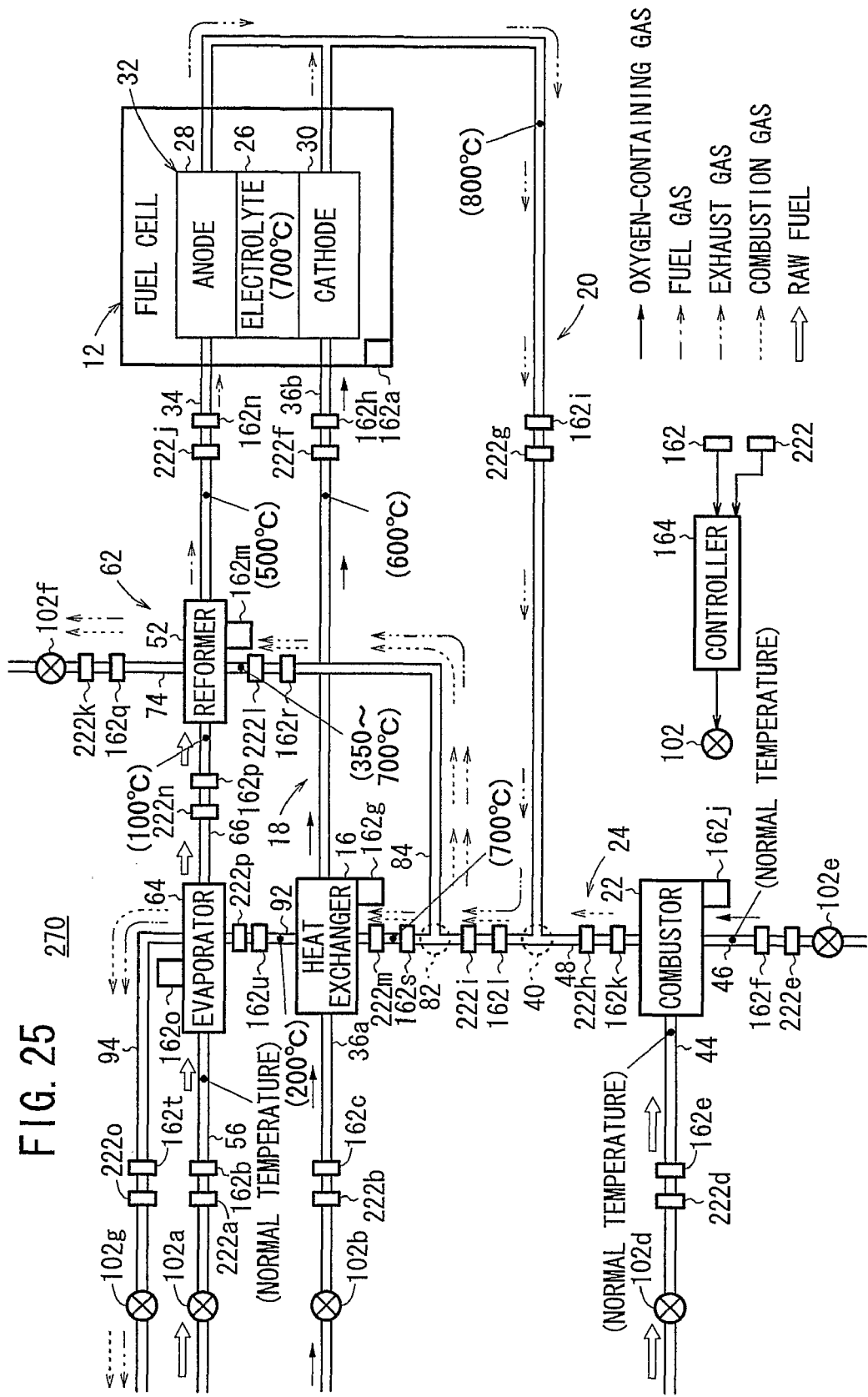
FIG. 25 is a block diagram showing the manner in which the fuel cell system according to the twenty-fourth embodiment operates.

FIG. 25 shows the temperatures of the respective regions in the fuel cell system 270 while the fuel cell system 270 is in normal operation. When the flow rate regulating valve 102*a* is operated, the flow rate of the raw fuel is regulated to regulate the flow rate of the fuel gas. Therefore, the amount of electric power generated by the fuel cell 12 is controlled, and the flow rate of the exhaust gas therefrom is regulated. When the flow rate regulating valve 102*b* is operated, the flow rate of the supplied oxygen-containing gas is controlled to regulate the amount of electric power generated by the fuel cell 12, and the flow rate of the exhaust gas therefrom is varied.

When the flow rate regulating valve 102*d* is operated, the flow rate of the raw fuel supplied to the combustor 22 is regulated. When the flow rate regulating valve 102*e* is operated, the flow rate of the oxygen-containing gas supplied to the combustor 22 is regulated. Therefore, the combustor 22 controls the amount of heat to regulate the flow rate of the combustion gas.

When the flow rate regulating valves 102*f*, 102*g* are operated, the flow rate of the combustion gas supplied to the reformer 52 and the flow rate of the combustion gas supplied to the heat exchanger 16 and the evaporator 64 is regulated. Therefore, when the flow rate regulating valves 102*a*, 102*b*, 102*d*, 102*e*, 102*f*, 102*g* are operated, the temperatures and flow rates in the fuel cell system 270 are controlled.

Figure 26:
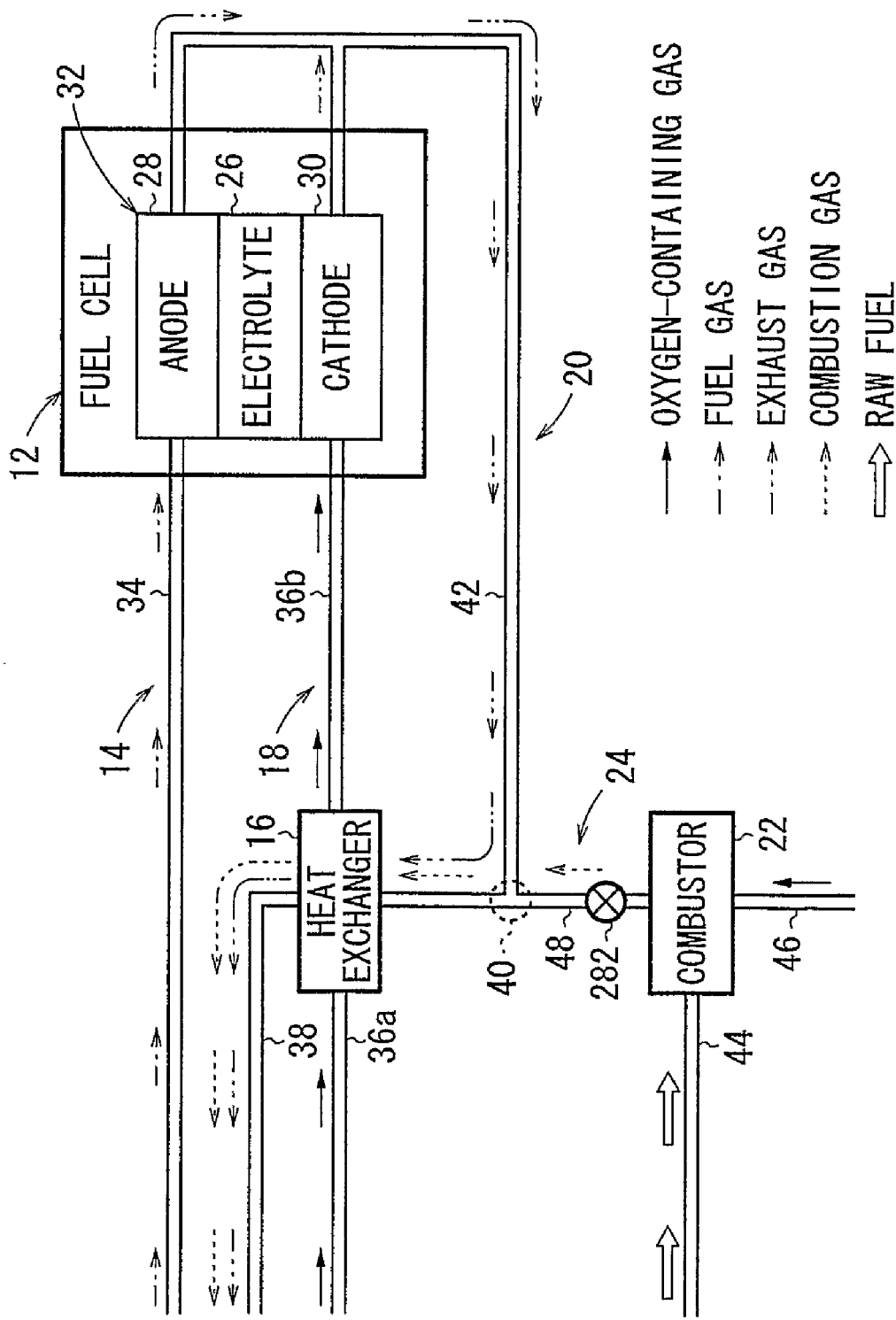
FIG. 26 is a block diagram of a fuel cell system according to a twenty-fifth embodiment of the present invention.

FIG. 26 shows in block form a fuel cell system 280 according to a twenty-fifth embodiment of the present invention.

In the fuel cell system 280, the combustion gas supply unit 24 has a check valve 282 connected to the combustion gas supply passage 48 between the junction 40 and the combustor 22. The check valve 282 prevents the exhaust gas that flows through the exhaust gas supply passage 42 to the junction 40 from flowing into the combustor 22. Therefore, the combustor 22 is not exposed to the exhaust gas from the fuel cell 12, and hence remains highly durable.

Figure 27:
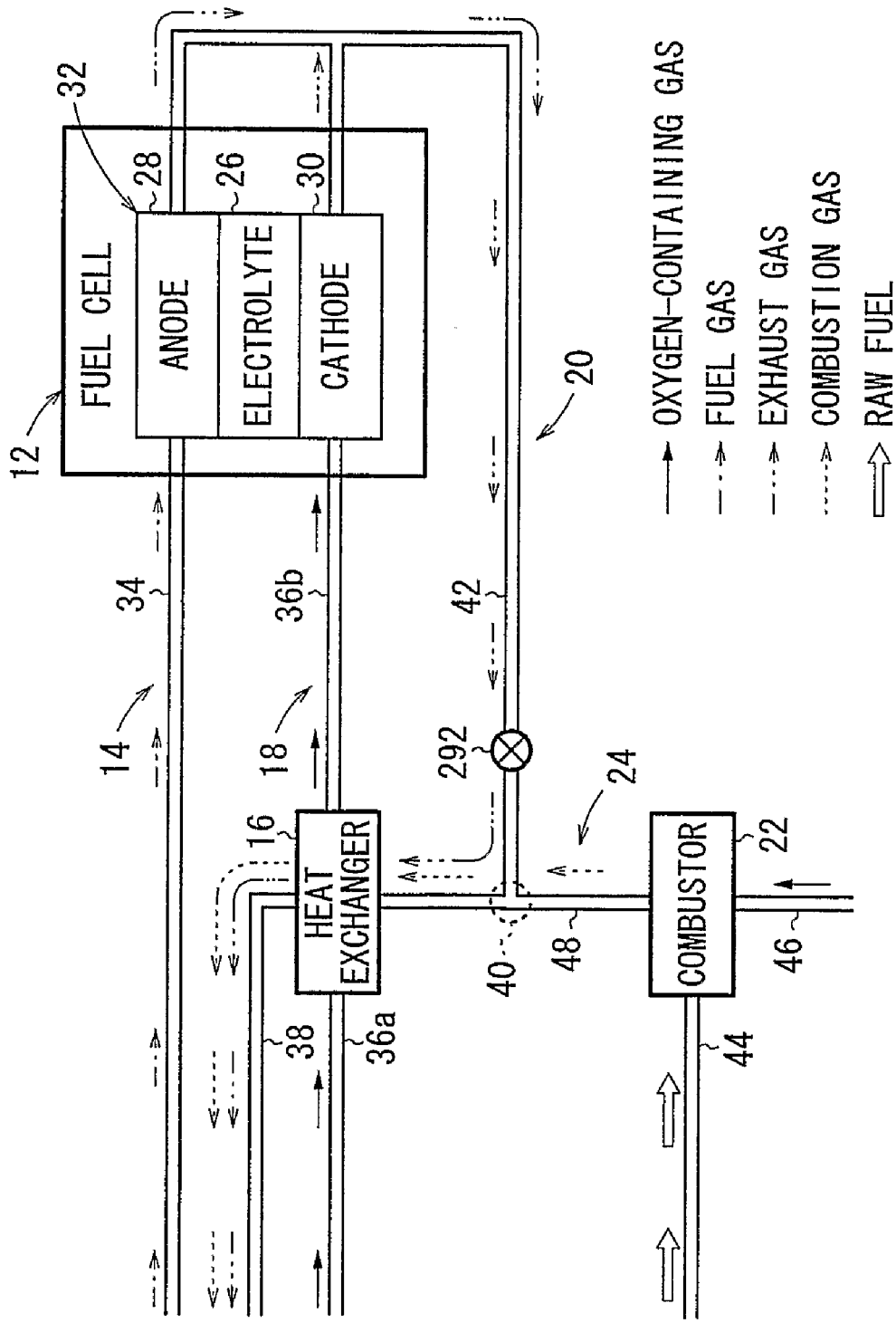
FIG. 27 is a block diagram of a fuel cell system according to a twenty-sixth embodiment of the present invention.
Figure 28:
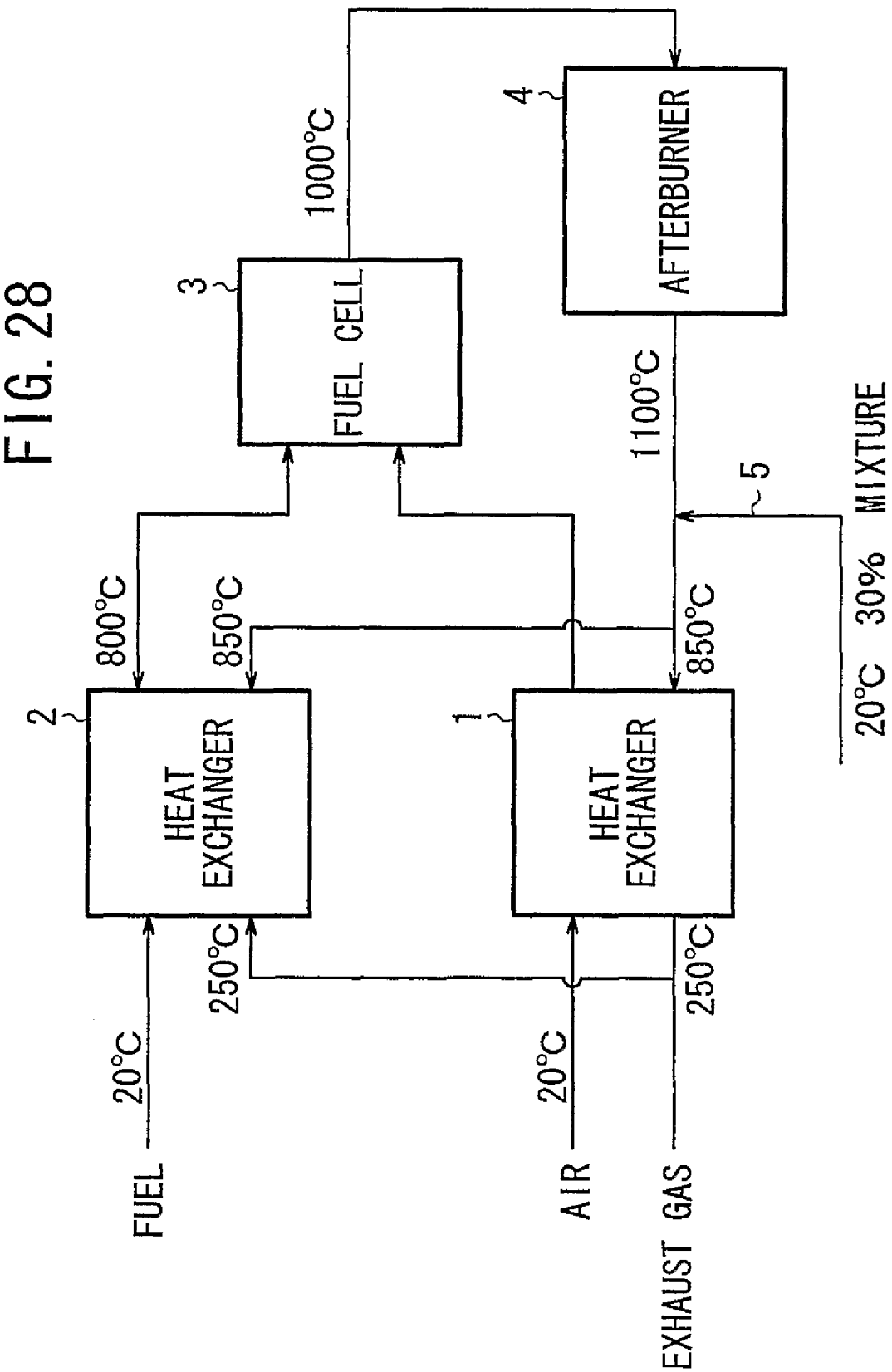
FIG. 28 is a block diagram of a conventional solid electrolyte fuel cell electric generator.

FIG. 27 shows in block form a fuel cell system 290 according to a twenty-sixth embodiment of the present invention.

In the fuel cell system 290, the exhaust gas discharge unit 20 has a check valve 292 connected to the exhaust gas supply passage 42. The check valve 292 prevents the combustion gas generated by the combustor 22 from flowing through the junction 40 into the exhaust gas supply passage 42 of the exhaust gas discharge unit 20. Therefore, the fuel cell 12 is prevented from being exposed to the combustion gas. The anode 28 and the cathode 30 of the fuel cell 12 are reliably prevented from being degraded by exposure to the combustion gas.

The invention claimed is:

1. A fuel cell system comprising:
  a fuel cell having an electrolyte electrode assembly which comprises an anode, a cathode and an electrolyte interposed between said anode and said cathode;
  a fuel gas supply unit for supplying a fuel gas to said fuel cell;
  an oxygen containing gas supply unit, which has a heat exchanger for heating an oxygen-containing gas, for supplying the oxygen containing gas heated by said heat exchanger to said fuel cell;
  an exhaust gas discharge unit configured to receive the fuel gas and the oxygen-containing gas discharged from said fuel cell after being used in a generating reaction, as a heating medium for heating the oxygen-containing gas to said heat exchanger; and
  a combustion gas supply unit, which has a combustor disposed out of a passageway of said exhaust gas discharge unit configured to generate a combustion gas by combusting a fuel with an oxygen-containing gas supplied thereto, for supplying said combustion gas, together with fuel gas and the oxygen-containing gas discharged from said fuel cell, to said heat exchanger,
  wherein said fuel gas supply unit has a reformer for reforming a raw fuel, which chiefly contains hydrocarbon, into the fuel gas, and
  wherein said combustion gas supply unit has a combustion gas supply passage for supplying the combustion gas to said reformer,
  wherein said exhaust gas discharge unit has an exhaust gas supply passage configured to receive the fuel gas from an anode exhaust passage and the oxygen-containing gas from a cathode exhaust passage discharged from said fuel cell, and said combustion gas supply unit has a combustion has supply passage configured to supply the combustion gas, said exhaust gas supply passage and said combustion gas supply passage being connected to each other by a passage junction and connected to said heat exchanger through said junction,
  wherein the exhaust gas supply passage is configured to receive an anode exhaust and a cathode exhaust gas exhausted from said fuel cell.

2. A fuel cell system according to claim 1, wherein said fuel gas supply unit has an evaporator for evaporating water to generate a mixed fuel including the raw fuel and water vapor.

3. A fuel cell system according to claim 2, wherein said combustion gas supply unit has a combustion gas supply passage for supplying the combustion gas to said evaporator.

4. A fuel cell system according to claim 1 further comprising:
  a flow rate regulating valve disposed in at least one of said fuel gas supply unit, said oxygen containing gas supply unit, said combustion gas supply unit, and said exhaust gas discharge unit.

5. A fuel cell system according to claim 4, wherein said flow rate regulating valve is connected to a fluid passage which is supplied with a fluid before the fluid is heated or a fluid passage which is supplied with a fluid after the fluid is cooled.

6. A fuel cell system according to claim 4, further comprising:
  a temperature detector disposed on at least one of said fuel cell, said fuel gas supply unit, said oxygen containing gas supply unit, said combustion gas supply unit, and said exhaust gas discharge unit.

7. A fuel cell system according to claim 6, further comprising:
  a flow rate detector disposed in at least one of said fuel gas supply unit, said oxygen containing gas supply unit, said combustion gas supply unit, and said exhaust gas discharge unit.

8. A fuel cell system according to claim 1, further comprising:
  a check valve disposed in said combustion gas supply unit for preventing the fuel gas and the oxygen-containing gas discharged from said fuel cell from flowing into said combustor.

9. A fuel cell system according to claim 1, further comprising:
a check valve disposed in said exhaust gas discharge unit for preventing said combustion gas from flowing into said fuel cell.

10. A method of operating a fuel cell system including a fuel cell, said fuel cell having an anode and a cathode by supplying a fuel gas to said anode, heating an oxygen-containing gas with a heat exchanger, and supplying the heated oxygen-containing gas to said cathode, comprising the steps of:
supplying a fuel gas and the oxygen-containing gas to a combustor to generate a combustion gas, and supplying the combustion gas to a combustion gas supply passage of a combustion gas supply unit to supply the combustion gas as a heating medium to said heat exchanger;
supplying a fuel gas and an oxygen-containing gas discharged from said fuel cell after being used in a generating reaction to an exhaust gas discharge passage of an exhaust gas discharge unit, so as to mix the fuel gas and the oxygen-containing gas after being used in the generating reaction with the combustion gas at a passage junction where the exhaust gas discharge passage is connected to the combustion gas supply passage, and supplying the mixed gas to said heat exchanger, wherein the exhaust gas discharge passage is supplied with an anode exhaust gas and a cathode exhaust gas exhausted from the fuel cell;
detecting a temperature of at least one of said fuel cell, a fuel gas supply unit, an oxygen containing gas supply unit, the combustion gas supply unit, and the exhaust gas discharge unit; and
regulating a flow rate of at least one of the fuel gas, the oxygen-containing gas, the fuel, the combustion gas, and the fuel gas and the oxygen-containing gas discharged from said fuel cell, based on the detected temperature.

11. A method according to claim 10, wherein the flow rate is regulated to keep the detected temperature within a predetermined temperature range.

12. A method according to claim 10, further comprising the steps of:
detecting a flow rate in at least one of said fuel gas supply unit, said oxygen containing gas supply unit, said combustion gas supply unit, and said exhaust gas discharge unit; and
regulating the flow rate of at least one of the fuel gas, the oxygen-containing gas, the fuel, the combustion gas, and the fuel gas and the oxygen-containing gas discharged from said fuel cell, based on the detected temperature and the detected flow rate.

13. A method according to claim 12, wherein the flow rate is regulated to keep said detected flow rate within a predetermined flow rate range.

* * * * *